(12) United States Patent
Leitch et al.

(10) Patent No.: US 11,958,632 B2
(45) Date of Patent: Apr. 16, 2024

(54) PREDICTIVE MAINTENANCE MODEL DESIGN SYSTEM

(71) Applicant: The Boeing Company, Chicago, IL (US)

(72) Inventors: Robert Michael Leitch, Vancouver (CA); Yikan Wang, Burnaby (CA); Bingjing Yu, Richmond (CA)

(73) Assignee: The Boeing Company, Arlington, VA (US)

( * ) Notice: Subject to any disclaimer, the term of this patent is extended or adjusted under 35 U.S.C. 154(b) by 124 days.

(21) Appl. No.: 17/378,674

(22) Filed: Jul. 17, 2021

(65) Prior Publication Data

US 2022/0026895 A1    Jan. 27, 2022

Related U.S. Application Data

(60) Provisional application No. 63/055,289, filed on Jul. 22, 2020.

(51) Int. Cl.
*G05B 23/02* (2006.01)
*B64F 5/40* (2017.01)
(Continued)

(52) U.S. Cl.
CPC .................. *B64F 5/40* (2017.01); *B64F 5/60* (2017.01); *G05B 23/0216* (2013.01);
(Continued)

(58) Field of Classification Search
CPC .......... B64F 5/40; B64F 5/60; G05B 23/0283; G05B 23/0216; G05B 23/0235; G05B 23/024; G05B 23/0281
See application file for complete search history.

(56) References Cited

U.S. PATENT DOCUMENTS 6,617,972 B2    9/2003    Takarada et al.
7,230,527 B2    6/2007    Basu et al.
(Continued)

FOREIGN PATENT DOCUMENTS

WO    WO-0131579 A2 *    5/2001    ........... G06K 9/6228
WO    WO-2021059302 A2 *    4/2021    ........... G05B 23/024

OTHER PUBLICATIONS

Mofokeng et al., Analysis of aircraft maintenance processes and cost, 2020, Elsevier B.V., 27th CIRP Life Cycle Engineering (LCE) Conference, CIRP 90, pp. 467-472 (Year: 2020).*
(Continued)

*Primary Examiner* — Mischita L Henson
(74) *Attorney, Agent, or Firm* — Kolisch Hartwell, P.C.

(57) ABSTRACT

A data processing system for generating predictive maintenance models is disclosed, including one or more processors, a memory, and a plurality of instructions stored in the memory. The instructions are executable to receive a historical dataset relating to each system of a plurality of systems, the historical dataset including maintenance data and operational data. The instructions are further executable to evaluate correlation between each of a plurality of operational data features and maintenance events of the maintenance data, using a supervised machine learning classification model. The instructions are further executable to display a quantitative result of the evaluation for each operational data feature in a graphical user interface, receive a selection of one or more operational data features of the plurality of operational data features, and generate a predictive maintenance model using the selected one or more operational data features according to a machine learning method.

20 Claims, 10 Drawing Sheets

(51) Int. Cl.
  *B64F 5/60* (2017.01)
  *G06N 5/04* (2023.01)
  *G06N 20/00* (2019.01)
  *G06Q 10/20* (2023.01)

(52) U.S. Cl.
  CPC ....... *G05B 23/0235* (2013.01); *G05B 23/024* (2013.01); *G05B 23/0281* (2013.01); *G05B 23/0283* (2013.01); *G06N 5/04* (2013.01); *G06N 20/00* (2019.01); *G06Q 10/20* (2013.01)

(56) References Cited

U.S. PATENT DOCUMENTS

| | | | |
|---|---|---|---|
| 7,349,825 B1 | 3/2008 | Williams et al. | |
| 7,621,193 B2 | 11/2009 | Fay et al. | |
| 8,040,243 B2 | 10/2011 | Bommer et al. | |
| 8,054,092 B2 | 11/2011 | Fay et al. | |
| 8,138,773 B2 | 3/2012 | Fay et al. | |
| 8,237,548 B2 | 8/2012 | Fay et al. | |
| 8,620,714 B2 | 12/2013 | Williams et al. | |
| 8,779,729 B2 | 7/2014 | Shiraishi | |
| 9,002,722 B2 | 4/2015 | Helms et al. | |
| 9,619,881 B2 | 4/2017 | Maddah et al. | |
| 9,633,171 B2 | 4/2017 | McNair | |
| 9,655,564 B2 | 5/2017 | Sternickel et al. | |
| 9,659,087 B2 | 5/2017 | Cazzanti et al. | |
| 10,062,053 B1 | 8/2018 | Oakley et al. | |
| 10,268,948 B2 | 4/2019 | Warn et al. | |
| 10,317,870 B1 | 6/2019 | Burnett et al. | |
| 10,401,319 B2 | 9/2019 | Mitchell et al. | |
| 10,776,760 B2 | 9/2020 | Ethington et al. | |
| 10,963,491 B2 | 3/2021 | Weinstein et al. | |
| 2007/0114422 A1 | 5/2007 | Berkcan et al. | |
| 2008/0215513 A1* | 9/2008 | Weston | G06F 18/2115 706/13 |
| 2012/0098518 A1 | 4/2012 | Unagami et al. | |
| 2014/0278713 A1 | 9/2014 | Zivelin et al. | |
| 2016/0178714 A1 | 6/2016 | Fautz | |
| 2016/0358099 A1 | 12/2016 | Sturlaugson et al. | |
| 2017/0097860 A1 | 4/2017 | Pang | |
| 2017/0166328 A1 | 6/2017 | Ethington et al. | |
| 2017/0193372 A1 | 7/2017 | Schimert | |
| 2017/0319097 A1 | 11/2017 | Amthor et al. | |
| 2017/0364831 A1 | 12/2017 | Ghosh et al. | |
| 2018/0024214 A1 | 1/2018 | Bhat et al. | |
| 2018/0202959 A1 | 7/2018 | Mitchell et al. | |
| 2019/0092495 A1 | 3/2019 | Lu et al. | |
| 2019/0156298 A1 | 5/2019 | Ethington et al. | |
| 2019/0187685 A1 | 6/2019 | Cella et al. | |
| 2019/0303496 A1 | 10/2019 | Weinstein et al. | |
| 2020/0134369 A1* | 4/2020 | Chopra | B64D 45/00 |
| 2020/0225655 A1 | 7/2020 | Cella et al. | |
| 2020/0250905 A1 | 8/2020 | Sundareswara et al. | |
| 2020/0293940 A1 | 9/2020 | Chopra et al. | |
| 2020/0379454 A1 | 12/2020 | Trinh et al. | |
| 2020/0410459 A1 | 12/2020 | Ethington et al. | |
| 2021/0004284 A1 | 1/2021 | Vah et al. | |
| 2021/0277906 A1 | 9/2021 | Megchiani et al. | |

OTHER PUBLICATIONS

U.S. Patent and Trademark Office, Final Office Action regarding U.S. Appl. No. 17/020,560, dated Jan. 31, 2023, 13 pages.
U.S. Patent and Trademark Office, Non-Final Office Action regarding U.S. Appl. No. 17/020,560, dated Sep. 22, 2022, 14 pages.
U.S. Patent and Trademark Office, Non-Final Office Action regarding U.S. Appl. No. 17/378,676, dated Sep. 8, 2022, 38 pages.
U.S. Patent and Trademark Office, Final Office Action regarding U.S. Appl. No. 17/378,676, dated Apr. 28, 2023, 39 pages.
U.S. Patent and Trademark Office, Non-Final Office Action regarding U.S. Appl. No. 17/020,560, dated Aug. 25, 2023, 9 pages.

* cited by examiner

FIG. 11

PREDICTIVE MAINTENANCE MODEL DESIGN SYSTEM

CROSS-REFERENCES

This application claims the benefit under 35 U.S.C. § 119(e) of the priority of U.S. Provisional Patent Application Ser. No. 63/055,289, filed Jul. 22, 2020, the entirety of which is hereby incorporated by reference for all purposes.

BACKGROUND

Data are routinely collected by engineers on both maintenance and operation of equipment such as the aircraft of an airline's fleet, and can offer valuable insights into future performance and potential repair needs. However, the complexity and sheer quantity of the collected data renders much useful analysis beyond the skills of a typical safety or maintenance engineer. Even for trained engineering analysts with the requisite specialist skills the process can be time consuming and laborious using typical software tools such as Excel or Tableau.

Machine learning is an increasingly popular tool for utilizing and interpreting such large datasets, but may be out of reach for a typical safety or maintenance engineer. Effective application of machine learning techniques to a maintenance problem typically requires identification of a relevant data pattern or pre-cursor signature, as well as expertise in data science to select and tune an appropriate algorithm, and programming skills to implement training and evaluation of the algorithm to generate a predictive model.

Augmented analytics and software tools to assist in the data analysis and model design process are desirable, to bring the power and insights of trend analysis and predictive models to a broader range of users, and simplify and accelerate the process for experienced analysts and data scientists.

SUMMARY

The present disclosure provides systems, apparatus, and methods relating to predictive maintenance model design. In some examples, a data processing system for generating predictive maintenance models may include one or more processors, a memory including one or more digital storage devices, and a plurality of instructions stored in the memory. The instructions may be executable by the one or more processors to receive a historical dataset relating to each system of a plurality of systems, the historical dataset including maintenance data and operational data. The instructions may be further executable to evaluate correlation between each of a plurality of operational data features and maintenance events of the maintenance data, using a supervised machine learning classification model. The instructions may be further executable to display a quantitative result of the evaluation for each operational data feature in a graphical user interface, receive a selection of one or more operational data features of the plurality of operational data features, and generate a predictive maintenance model using the selected one or more operational data features according to a machine learning method.

In some examples, a computer implemented method of generating a predictive maintenance model may include receiving a historical dataset relating to each system of a plurality of systems, the historical dataset including maintenance data and operational data. The method may further include evaluating correlation between each of a plurality of operational data features and maintenance events of the maintenance data, using a supervised machine learning classification model. The method may further include displaying a quantitative result of the evaluation for each operational data feature in a graphical user interface, receiving a selection of one or more operational data features of the plurality of operational data features, and generating a predictive maintenance model using the selected one or more operational data features according to a machine learning method.

In some examples, a computer program product for generating predictive maintenance models may include a non-transitory computer-readable storage medium having computer-readable program code embodied in the storage medium, the computer-readable program code configured to cause a data processing system to generate a predictive maintenance model. The code may include at least one instruction to receive a historical dataset relating to each system of a plurality of systems, the historical dataset including maintenance data and operational data. The code may further include at least one instruction to evaluate correlation between each of a plurality of operational data features and maintenance events of the maintenance data, using a supervised machine learning classification model. The code may further include at least one instruction to display a quantitative result of the evaluation for each operational data feature in a graphical user interface, receive a selection of one or more operational data features of the plurality of operational data features, and generate a predictive maintenance model using the selected one or more operational data features according to a machine learning method.

Features, functions, and advantages may be achieved independently in various examples of the present disclosure, or may be combined in yet other examples, further details of which can be seen with reference to the following description and drawings.

BRIEF DESCRIPTION OF THE DRAWINGS

FIG. 11 is a diagram of an illustrative data feature selection and evaluation GUI.

DETAILED DESCRIPTION

Various aspects and examples of a predictive maintenance model design system including a maintenance event categorization module and/or a feature evaluation module, as well as related systems and methods, are described below and illustrated in the associated drawings. Unless otherwise specified, a design system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview

Figure 1:
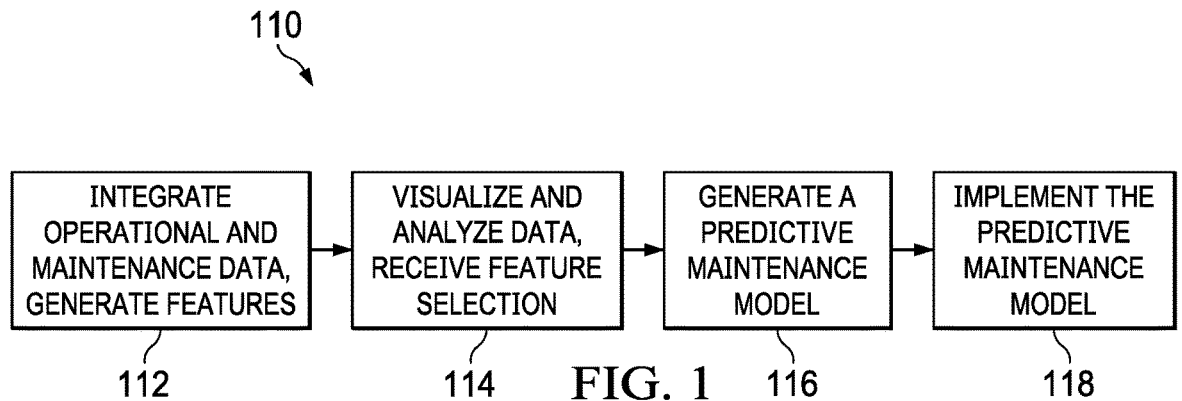
FIG. 1 is a flow chart depicting steps of an illustrative predictive maintenance model design process in accordance with aspects of the present disclosure.

In general, a predictive maintenance model design system may be configured to assist a user in discovering and interpreting data trends and patterns, designing and training a prediction algorithm, and/or implementing a generated predictive maintenance model. For example, the design system may be a data processing system and/or a software program configured to execute a process 110, as shown in FIG. 1, to generate a machine learning model for predicting maintenance requirements of a system based on historical maintenance and operational data of a plurality of systems by detecting predictive anomalies in ongoing operational data.

At step 112 process 110 includes integrating operational and maintenance data, and generating data features. The integration may include receiving at least two distinct datasets for a plurality of systems such as a fleet of aircraft, and combining the data to form a single historical dataset. The datasets may be stored in the memory of the processing system on which process 110 is executed, may be available on a server for access over a network of some kind, or may be received by any effective means. In some examples, data may be drawn from multiple databases and/or from disparate sources.

Integrating the data may also include pre-processing or modification to prepare the data for use. The dataset may include numerical values organized as attributes of a plurality of maintenance and/or repair records and a plurality of telemetry and/or sensor records for each of a plurality of systems (e.g., aircraft). Raw attribute data from the telemetry records may be processed to generate one or more operational data features. The data features may be an unaltered attribute, may be a statistical function of an attribute, and/or may be an aggregate of multiple attributes or records.

At step 114, process 110 includes visualizing and analyzing the historical dataset, and receiving a selection of operational data features. The visualization may include displaying a variety of graphs, charts, plots, and tables in a graphical user interface (GUI) along with a plurality of interactive elements. Raw maintenance and operational data from the historical dataset, generated data features, and/or results of analysis of the dataset may be visualized. A user such as an engineering analyst may use the visualizations to identify trends in the sensor data that are indicative of equipment degradation and failure. Facilitating rapid identification of signs of deviation from normal operation by such an analysis is desirable in order to allow efficient generation of useful predictive models.

The interactive elements of the GUI may be configured to allow input of constraints on what data is visualized, initiation of desired analysis, and selection of operational data features. For example, the GUI may include selection boxes or buttons, display of contextual information on cursor hover, drill-down from graphs to tables or from complete dataset to data subsets, a refresh trigger, a mathematical function input, and/or any GUI elements known to those skilled in the art of software design.

At step 116, process 110 includes generating a predictive maintenance model based on the selected operational data features. Model generation may include selection of an appropriate anomaly detection algorithm, and input of algorithm parameters. In some examples, one or more algorithm templates may be presented in the GUI. In some examples, a plurality of logic block elements may be placeable in an interactive workflow building environment to define an appropriate algorithm and parameters.

Generating the predictive maintenance model may further include training and testing the selected algorithm. The algorithm may be trained and evaluated one or more times, and detailed test results displayed in the GUI. A selection of an algorithm configuration exhibiting desired properties may be received. The selected algorithm configuration may then be used to train a final model on the full historical dataset.

At step 118, the process includes implementing the generated predictive maintenance model. In some examples, the generated model may be prepared for deployment by software and/or a data processing system separate from the predictive maintenance model design system used to execute process 110. In such examples, the generated model may be prepared for deployment as part of a software program, or may be converted to an accessible format, e.g., including an application programming interface (API).

In some examples, implementing the generated predictive maintenance model may include receiving additional operational data. For instance, additional flight data may be recorded by an aircraft fleet and input to the predictive maintenance model design system running process 110. The predictive maintenance model may be applied to the additional operational data, and generate alerts for detected anomalies. Based on the generated alerts, proactive and preventative maintenance action such as inspection, testing, repair, or replacement of equipment, may be taken by maintenance workers to avoid potential costly and disruptive unplanned component replacements or other undesirable maintenance events.

Process 110 may be repeated to generate additional predictive maintenance models. For example, a suite of predictive maintenance models may be generated for an aircraft fleet. Over time, additional models may be generated or re-generated based on new data and/or to address new maintenance challenges.

Aspects of a predictive maintenance model design system or design process such as process 110 may be embodied as a computer implemented method, computer system, or computer program product. Accordingly, aspects of a predictive maintenance model design system may take the form of an entirely hardware example, an entirely software example (including firmware, resident software, micro-code, and the like), or an example combining software and hardware aspects, all of which may generally be referred to herein as a "circuit," "module," or "system." Furthermore, aspects of the predictive maintenance model design system may take the form of a computer program product embodied in a computer-readable medium (or media) having computer-readable program code/instructions embodied thereon. The computer-readable program code may be configured to cause a data processing system to generate a predictive maintenance model.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a cloud-based storage service, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of a predictive maintenance model design process may be written in one or any combination of programming languages, including an object-oriented programming language such as Java, Smalltalk, C++, Python, and/or the like, and conventional procedural programming languages, such as C. Mobile apps may be developed using any suitable language, including those previously mentioned, as well as Objective-C, Swift, C#, HTML5, and the like.

The program code may execute entirely on a user's computer, partly on the user's computer, as a stand-alone software package, partly on the user's computer and partly on a remote computer, or entirely on the remote computer or server. In the latter scenario, the remote computer or server may be connected to the user's computer through any type of network, including a local area network (LAN) or a wide area network (WAN), and/or the connection may be made to an external computer (for example, through the Internet using an Internet Service Provider). The remote computer or server may be part of a cloud-based network architecture, such as a cloud computing service or platform. In some examples, the program code may be executed in a software-as-a-service (SaaS) framework accessed by a file transfer protocol such as secure shell file transfer protocol (SFTP) and/or an internet browser on the user's computer.

Aspects of the predictive maintenance design system are described below with reference to flowchart illustrations and/or block diagrams of methods, apparatus, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the predictive maintenance design system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary predictive maintenance model design systems, event categorization modules and/or feature evaluation modules as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Predictive Maintenance Model Design System

Figure 2:
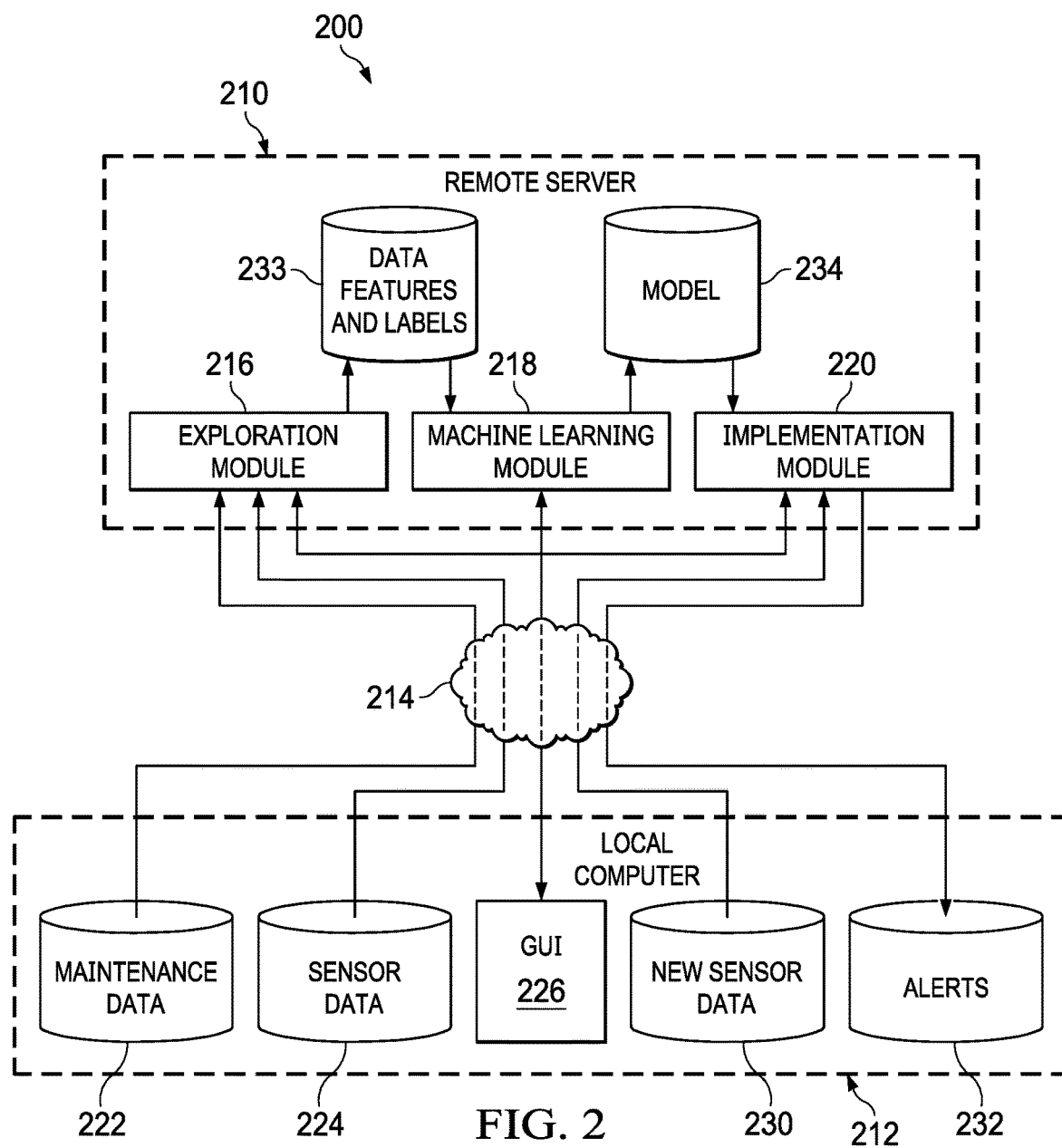
FIG. 2 is a schematic diagram of an illustrative predictive maintenance model design system.
Figure 3:
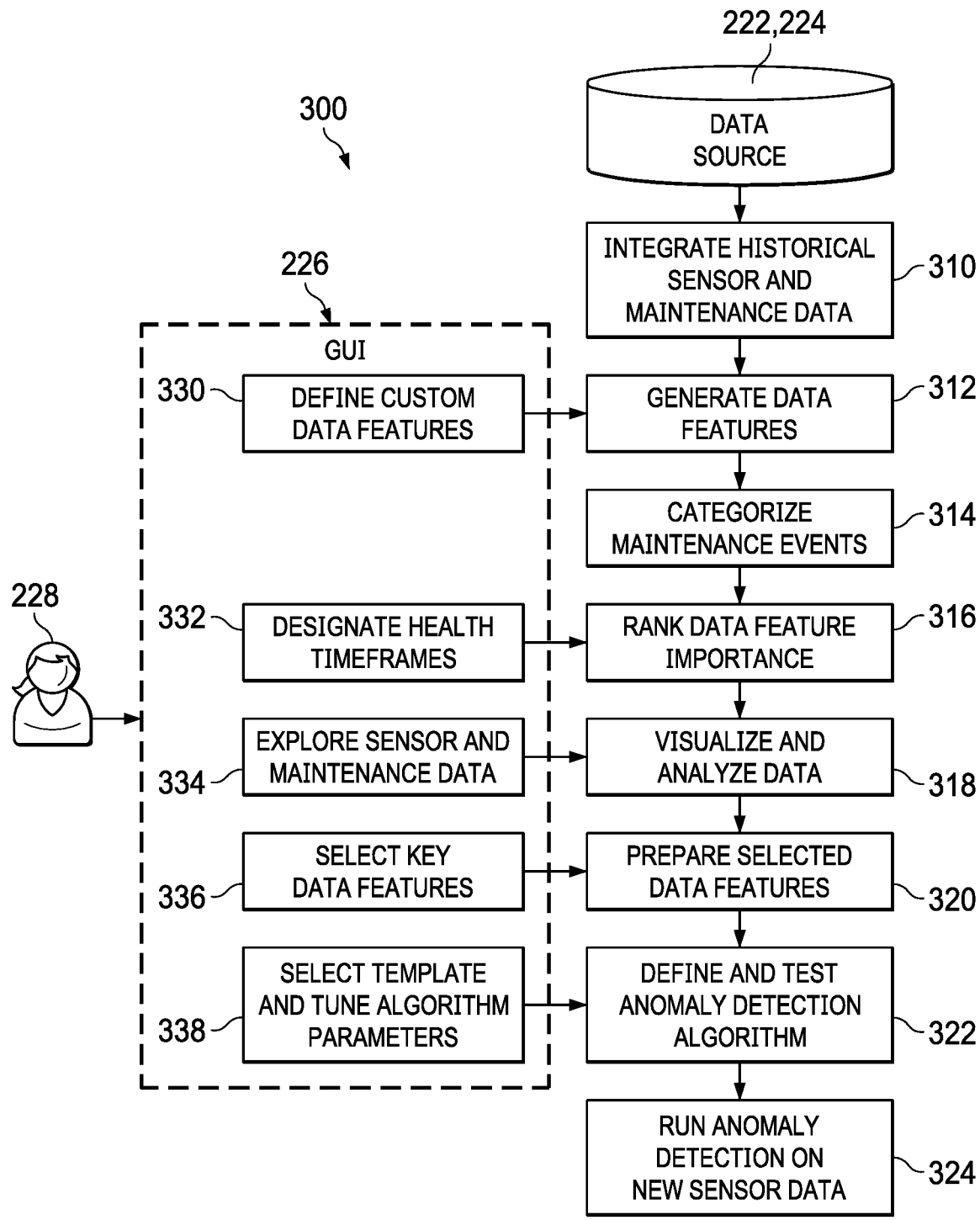
FIG. 3 is a flow chart depicting steps of another illustrative predictive maintenance model design process in accordance with aspects of the present disclosure.

As shown in FIGS. 2 and 3, this section describes an illustrative system 200, configured to execute a design and implementation process 300. System 200 is an example of a predictive maintenance model design system, as described above. Design and implementation process 300 is an example of process 110, also as described above.

System 200 is configured to assist a user in completing process 300 to generate and implement machine learning models to detect anomalies in operational data which are indicative of future maintenance events. In the present example, system 200 is designed to generate models for a fleet of aircraft, based on recorded flight data. In some examples, system 200 may additionally or alternatively be used for predictive maintenance with respect to other mechanical systems, such as ground vehicles, ships, manufacturing equipment, industrial appliances, etc.

System 200 may be used to prepare models relating to different aspects (e.g., components or systems) of aircraft, and one set of historical data may be used to prepare multiple different models. For example, system 200 may be used to prepare a model for each of multiple subsystems present in an aircraft, to prepare a model for each class of sensor recording flight data, or to prepare a model for each failure mode of a particular component.

FIG. 2 is a schematic diagram depicting a remote server 210 and a local computer 212 on which design system 200 is executed. The server and/or computer may be an example of data processing system 900 as described in Example D, below. The server and local computer communicate, or exchange information, over a network 214 such as the Internet. Multiple modules of system 200 are run on remote server 210. The modules may comprise, for example, instructions and/or data stored in a memory and executed by a processor. The modules, which may also be referred to as programs or processes, include an exploration module 216, a machine learning module 218, and an implementation module 220.

Modules 216, 218, 220 may be described as performing steps 310-324 of process 300, in cooperation with a user 228 who performs steps 330-338 of the process, as depicted in FIG. 3. Process 300 may also be described entirely as steps performed by modules 216, 218, 220 including receiving inputs from user 228 as described in steps 330-338.

User 228 interacts with the modules of system 200 on remote server 210 through a graphical user interface (GUI) 226 on local computer 212. The user is guided through a data exploration and model design process by the GUI, then a generated model is implemented by remote server 210 on new operational data to return anomaly alerts. New operational data may be input and alerts returned on an ongoing basis.

In the present example, GUI 226 is executed by local computer 212. For instance, the user may access the GUI through an internet browser installed on the local computer, or system 200 may include a client-side program running on the local computer and displaying the GUI. In general, a user may interface with system 200 in any manner allowing effective display and input of information.

System 200 may be configured to facilitate exploration of multiple maintenance events of interest, investigation of multiple trends concurrently, design of multiple algorithms, and/or use by multiple users of local computer 212 through, for example, creation of multiple distinct sessions. Process 300 may be performed or repeated independently in each such session, and/or information such as data features, analysis results, or algorithm configurations may be accessible and/or selectively shared between sessions.

Exploration module 216 receives historical data from a maintenance data source 222 and a sensor or operational data source 224. In some examples, the module may receive historical data from a plurality of maintenance and/or operational data sources. Typically, flight data are recorded by airplane sensors and downloaded in large data sets post flight. In some examples, sensor data may additionally or alternatively be downloaded during a flight using a system such as Aircraft Communications Addressing and Reporting System (ACARS). Separately, airline maintenance teams maintain information logs, recording maintenance events, defects, and actions taken, using maintenance information systems in an airline back-office. These two information sources, flight data and maintenance data, are not integrated. However, in order to perform predictive maintenance analyses, flight data patterns over time may need to be compared with the occurrence of maintenance events.

To address this, exploration module 216 may integrate the datasets for analysis and visualization. Step 310 of process 300 includes integrating the historical maintenance and sensor data. The data may be integrated into a single historical dataset and prepared for display and analysis. For example, the data may be received from other software and may be converted from an output format of such software to a format appropriate to modules 216, 218 and 220. Preprocessing algorithms may be applied to the dataset to discretize continuous variables, reduce dimensionality, separate measurements into components, eliminate missing or inaccurate data, and/or any appropriate modifications. When the dataset includes data from multiple sources, pre-processing may include merging data, harmonizing formatting, and matching organizational structure.

Exploration module 216 is configured to integrate data saved locally to computer 212 (e.g., repair logs saved as spreadsheets and/or in a repair management software database). In some examples, the exploration module may also be configured to interface or communicate with external databases or database software to retrieve relevant data. For example, the exploration module may generate SQL queries to request data from an online database. Such connectivity may facilitate access to complete and up-to-date information. The module may also be configured to accept input of data in any anticipated format.

At step 312, exploration module 216 generates data features from the operational data of the historical dataset, including phase-dependent aggregate data features. Trending of recorded sensor data can be difficult due to large variations in sensor values that occur as a result of equipment operational cycles. For example, if an analyst simply aggregates the time series recordings for many aircraft flights into one large time series, and plots this data over long periods to look for a trend over time, the result is typically a very noisy distribution with no significant trends evident.

Digitally recorded sensor data, e.g. temperatures, pressures, electrical currents, and actuator positions, from an electro-mechanical system such as an aircraft or other vehicle, may be discrete samples in a time series covering a period of observation. For aircraft, these data are recorded for each flight. Typical sampling rates are 0.25 Hz to 8 Hz for modern commercial aircraft. The recorded values of these data vary substantially over the course of an operational cycle, e.g. during the flight of an aircraft. For example, recorded temperatures could vary by hundreds of degrees depending on variables such as altitude (e.g. ground level versus cruising altitude), operational mode of the equipment, and any dynamic operational control changes applied to the equipment, either automatically or via an explicit operator, e.g. pilot.

Exploration module 216 avoids this obfuscation by dividing the data according to a plurality of phases of the operational cycle before aggregation. For example, sensor data from an aircraft flight may be divided into phases of taxi-out, take-off, climb, cruise, descent, landing, and taxi-in. A range of aggregating functions may then be separately applied to the data associated with each phase, to create phase-dependent aggregate features that can be trended over long periods, e.g. thousands of flights. For instance, the data features may combine phase-dependence and a value constraint or a differential comparison with aggregating statistical functions.

In some examples the module may generate a pre-defined set of data features corresponding to a maintenance event of interest selected by the user. Such a set may include raw attribute data features and/or aggregate data features. For example, if the user selects an overheating event the generated data features may include a temperature sensor reading, an average temperature sensor reading during take-off, a difference in temperature reading between port and starboard sensors, and/or an average difference in temperature reading between port and starboard sensors during take-off.

At step 330, user 228 may define custom data features. In other words, exploration module 216 may receive a mathematical function or other logical ruleset defining a custom data feature from user 228, and generate a data feature accordingly. A GUI 226 of design system 200 may include an interface facilitating input of one or more such rulesets. Custom data features may include representations of recorded time-series sensor data that capture events, transitions, performance metrics, and states of the system under observation. Any custom defined data features may be ranked, visualized, and communicated to machine learning module 218 in the same manner as other data features generated at step 312, such as the pre-defined set of data features.

Exploration module 216 is further configured to categorize maintenance events, at step 314 of process 300. More specifically, the module may divide maintenance events of a selected type into two or more sub-categories based on machine learning analysis of the maintenance data. For example, topic modelling may be applied to text of maintenance logs to divide unplanned replacements of a selected component into a plurality of failure types. The maintenance events, sub-categories, and/or other results of the machine learning analysis may be displayed to user 228 through GUI 226.

At step 332, user 228 may designate health timeframes relative to recorded maintenance events. That is, exploration module 216 may receive one or more time thresholds from the user. For example, user 228 may indicate that components having undergone replacement are healthy for a first time period following replacement, and degraded for a second time period preceding replacement. The exploration module may subdivide operational data into labeled classes or categorizes based on this received designation. In some examples, exploration module 216 may automatically use maintenance event sequences to label the sensor data for the purposes of supervised machine learning, such as classification models for failure prediction.

At step 316, exploration module 216 ranks the importance of some or all of the data features generated in step 312. Importance may be ranked according to one or more quantitative measures of influence of a given data feature on predictive model performance. The ranking may indicate relative importance of the data features in predicting occurrence of a set of historical maintenance events.

The exploration module may use the designations from step 332 in a machine learning method to perform the ranking. In some examples, the user may select one or more data features and one or more maintenance events to be used in the ranking process. The machine learning method may evaluate correlation between data features and maintenance events in an absolute and/or relative sense. For example, the module may iterate supervised classification, eliminating a data feature at each iteration to generate a relative ranking of feature importance.

At step 334, user 228 may use GUI 226 to explore the sensor and maintenance data integrated at step 310. The user may also explore the data features generated at step 312, maintenance event categories generated at step 314, and/or data feature rankings generated at step 316. The user may explore the data in order to identify potential data patterns, pre-cursor signatures, and/or candidate data features useful for creating a predictive maintenance model.

At step 318, Exploration module 216 may visualize and analyze data to aid the user's data exploration. The exploration module is configured to visualize and display both the operational and maintenance data of the historical dataset in a manner that enables a user to discover behavior patterns in large sets of recorded flight sensor data. Flight sensor data and maintenance event data may be displayed overlaid together in one or more graphs and/or charts to allow the user to identify relevant correlations and trends over time. In other words, the exploration module automatically combines the flight data features and maintenance events into a single time series visualization, enabling visual identification of important flight data patterns that are associated with maintenance problems.

As described above with reference to step 312, trending raw sensor data may provide limited insight. Instead, exploration module 216 may display the generated phase-dependent aggregate data features. The health timeframes designated at step 332 may also be displayed relative to each maintenance event. Visualizations may be displayed to the user, and constraints, selections, and other inputs received from the user through GUI 226.

Exploration module 216 may perform automatic analysis of the historical dataset as well as additional analysis as selected by the user. Automatic analysis may include standard statistical measures, detection of potential seasonal bias, and/or any analysis typically relevant to maintenance prediction. In some examples, the analysis automatically performed may depend on the maintenance event of interest selected by the user.

GUI 226 may also provide user 228 control over iteration of steps 312-316, 330, and 332. For example, user 228 may identify a data trend of interest when exploring sensor and maintenance data in step 334 and perform step 330 again to define a related custom data feature, or may begin with step 318 to have the exploration module visualize and analyze data relevant to a data trend of interest before performing step 330 to define a related custom feature. The user may then trigger generation of the defined feature in step 312, and re-ranking of data feature importance in step 316.

At step 336, user 228 may select one or more key data features. That is, exploration module 216 may receive a selection of one or more data features. In some examples, the user may opt for the exploration module to perform an automatic selection of one or more data features. At step 320, the exploration module prepares the selected data features and any relevant related information, as appropriate. Exploration module 216 communicates a set of the data features and labels 233 to machine learning module 218.

Machine learning module 218 is configured to assist user 228 in defining, training, and evaluating candidate algorithms to arrive at a trained anomaly detection model having desired performance traits. The machine learning module may be configured to accommodate users of different levels of expertise and/or allow a user to select a desired level of guidance for a particular project. For example, GUI 226 may include first and second interfaces to the machine learning module.

The first and second interfaces may be designed for beginner and advanced users, or for simplified and complex design, respectively. A user may select the first interface due to limited experience, and/or in order to save time and avoid potential complications such as over-fitting. A user may select the second interface to build and test an algorithm from scratch and/or to create custom algorithm characteristics. In some examples, a user may start with a simple algorithm generated in the first interface, and introduce targeted complexity using tools in the second interface.

At step 338, user 228 may select a template and tune algorithm parameters. For example, the user may select an algorithm template with pre-determined parameters through the first interface, or may select an algorithm type and input all relevant parameters through the second interface. In either case, the machine learning module 218 may receive all necessary details of an anomaly detection algorithm configuration.

Appropriate algorithms may include supervised, unsupervised, or semi-supervised anomaly detection algorithms and techniques such as k-nearest neighbor, support vector machines, Bayesian networks, hidden Markov models, or deep learning. Input parameters and/or model settings may include tuning parameters such as feature data thresholds and relative weighting factors, data pre-processing methods such as smoothing, filtering, and normalization, and alert output criteria such as deviation persistence.

At step 322, the module defines and tests an anomaly detection algorithm based on the algorithm configuration selected at step 338 and the key data features selected in step 336. That is, the module trains and validates a predictive maintenance model. For example, the prepared data features may be divided into complementary training and validation data subsets, and the algorithm trained on the training data subset, then tested on the corresponding validation data subset. In some examples, the machine learning module may receive a selection of training and validation data sets from the user.

The algorithm may be trained and evaluated one or more times, and detailed test results reported to user 228 in GUI 226. Based on the evaluation results, the user may repeat step 338 and trigger a repeat of step 322 by the machine learning module. The GUI may also provide further tools for refining the algorithm, such as alternative training and testing methods and/or error investigation of individual cases.

In some examples, machine learning module 218 may be configured to train and evaluate multiple algorithm configurations, either concurrently or sequentially, and report a comparative analysis in addition to or in place of individual evaluation results. User 228 may repeat steps 338, 322 as necessary until arriving at a satisfactory algorithm configuration. For example, the user may select for desired properties such as high accuracy or low rate of false positives. The user may then trigger step 324 of process 300.

Implementation module 220 is configured to apply the final predictive maintenance model trained by machine learning module 218 to new operational data, detect anomalies in the data, and generate alerts accordingly. Machine learning module 218 may communicate a trained model 234 to implementation module 220, and the implementation module may receive new sensor data 230 from local computer 212. At step 324, the module runs anomaly detection on the new sensor data. The implementation module may then return alerts 232 to the local computer.

Similarly to exploration module 216, implementation module 220 is configured to integrate data saved locally to computer 212. In some examples, the implementation module may also be configured to interface or communicate with external databases or database software. Such connectivity may facilitate ongoing communication with operational databases for automatic generation of maintenance alerts. For instance, remote server 210 may communicate daily with a database of operational data to automatically receive recorded flight data added to the database during maintenance of an aircraft, and issue maintenance alerts before the aircraft returns to service.

B. Illustrative Maintenance Event Categorization Module

As shown in FIGS. 4-8, this section describes an illustrative maintenance event categorization module having a graphical user interface (GUI) 510, and an associated computer implemented method 400 of maintenance event categorization. The categorization module may be part of and/or a sub-module of an exploration module of a predictive maintenance model design system such as exploration module 216, described above. The categorization module may be used to perform step 314 of process 300, also described above. GUI 510 may be an example of GUI 226, as also described above.

The categorization module is configured to enable a user such as an engineering analyst to identify patterns in aircraft maintenance events such as unplanned component replacements based on a variety of maintenance logs and other maintenance data sources. The categorization module allows the user to manually and/or automatically categorize historical events into related clusters or groups.

For example, unplanned component replacements may be divided into groups, with each group representing a different failure mode of the component. For instance, unplanned removal events may be divided into electrical failure, thermal failure, mechanical failure, and unknown failure. Identification of these groups is very useful as each separate group may require development of a unique predictive algorithm. In other words, different failure modes often exhibit different failure signatures in the operational data. This type of analysis is typically very labor intensive to perform in the absence of automated tools with integrated data sources.

In some examples, unplanned component replacement patterns may be identified for the purpose of building anomaly detection algorithms to identify component degradation and predict failures in advance. In some examples, patterns may be identified in other types of maintenance events and/or for other purposes. For instance, analysis of failure modes may be used to propose and/or evaluate new routine preventative maintenance measures.

Figure 4:
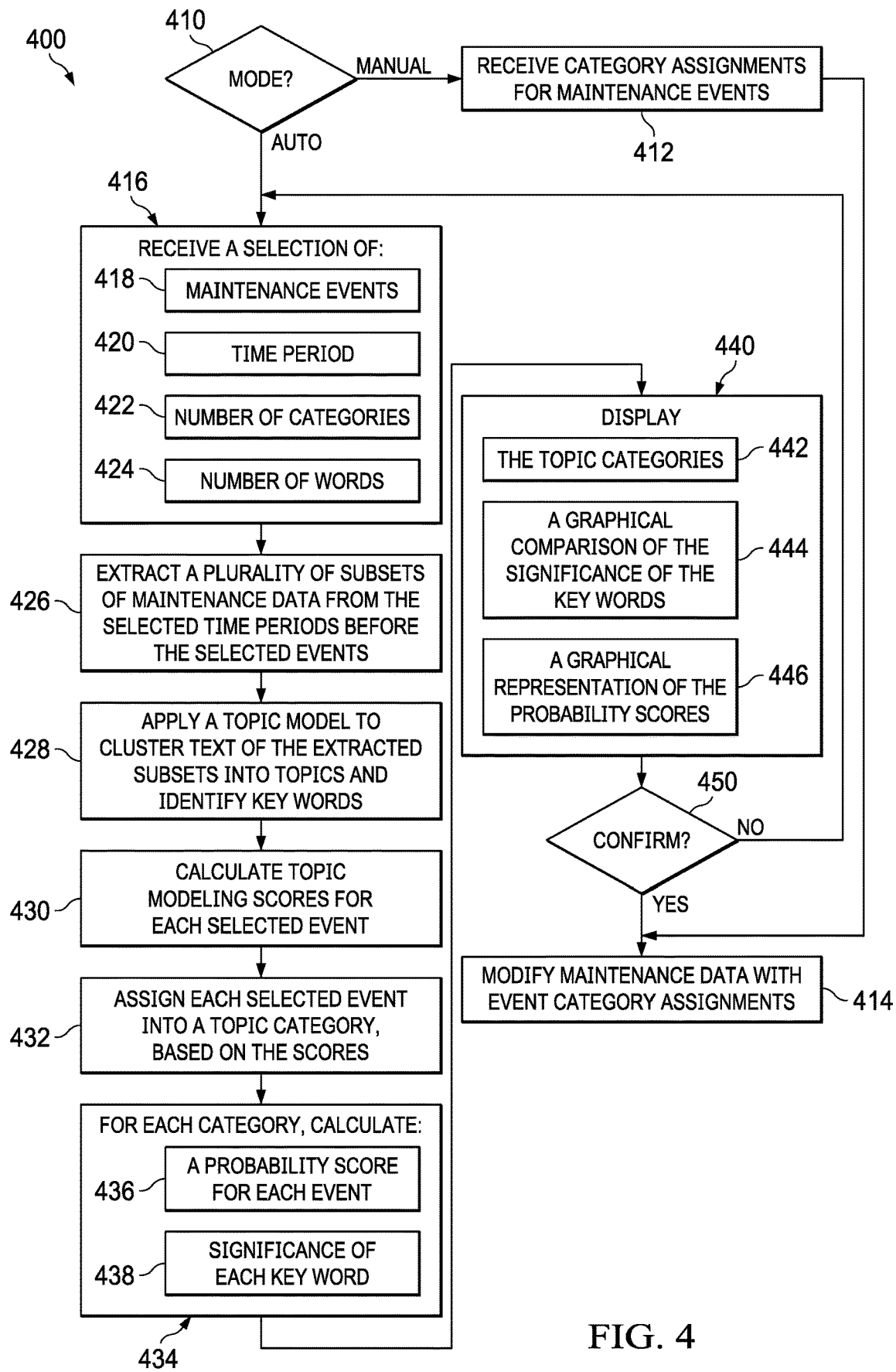
FIG. 4 is a flow chart depicting steps of an illustrative maintenance event categorization process.

FIG. 4 is a flow chart depicting steps of method 400 of maintenance event categorization. The categorization module receives selections from and displays categorization results to the user through GUI 510, shown in FIGS. 5-8.

To begin method 400, the categorization module may receive or access a historical dataset of operational and maintenance data. The dataset may consist of time-labeled historical maintenance and sensor data integrated from separate databases, cleaned, and pre-processed for display and analysis, as described in reference to step 310, above. In the present example the categorization module is configured for use with data from a fleet of aircraft. The maintenance data include records of maintenance events such as scheduled or unplanned component replacements, routine aircraft maintenance, and repair work. The records may include aircraft maintenance messages, aircraft fault messages, airline maintenance log entries, crew incident write-ups, shop findings, and/or shop tear-down reports.

Decision 410 of method 400 is between a manual mode and an automatic mode for event categorization. In the present example, GUI 510 includes two tabs, a manual-definition tab 512 and an auto-generation tab 514. A user may select one of the tabs to view an interface supporting a desired mode. If the user selects manual-definition tab 512, the method may proceed with step 412 and GUI 510 may display a manual entry interface not depicted in the Figures. If the user selects auto-generation tab 514, the method may proceed with step 416 and the interface of GUI 510 depicted in FIG. 5.

Step 412 includes receiving category assignments for maintenance events. The manual entry interface of GUI 510 may include a table displaying maintenance events of the historical database. For each event the table may list the respective aircraft, component, event date, event type, defect, maintenance action taken, and any associated shop findings. The user may enter a text label for each event into the displayed table, thereby assigning the event to a category. Maintenance events sharing a received label may form an event category.

In some examples, the manual entry interface of GUI 510 may also allow the user to review and modify category assignments made in steps 416-440 using the auto-generation interface. The automatically generated names of the automatically generated categories may be displayed as text labels in the maintenance event table, which may be editable by the user.

Step 414 includes modifying the maintenance data with the event category assignments, as made in either the manual or automatic mode. The categorization module may append a text label or other identifying information to the historical dataset, for each categorized maintenance event. The appended information may then be accessible by other modules of a predictive maintenance model design system, such as a feature evaluation module as described in Example C, or a data visualization module. Such modules may thereby allow a user to select, view, extract, and/or otherwise access maintenance events assigned to one or more categories. For example, the user may filter displayed maintenance events by category. For another example, only events of a selected category may be used in evaluation of a data feature or training of a predictive model.

Step 416 includes receiving multiple selections from the user. More specifically, the step includes receiving a selection 418 of maintenance events, a selection 420 of a time period, a selection 422 of a number of categories, and a selection 424 of a number of words. Step 416 may be repeated in method 400, and/or the method may be repeated in full. The event categorization process may be iterative, with repeated selection of constraints and display of generated categories. The user may evaluate the generated categories and repeat the process with different selections until satisfied with the category definitions and assignment of events to the categories. In some examples, the user may apply the generated categories to other data analysis or model training and then repeat method 400 to generate categories better suited to the subject analysis or training and/or better suited to another type of data analysis or model training.

Figure 5:
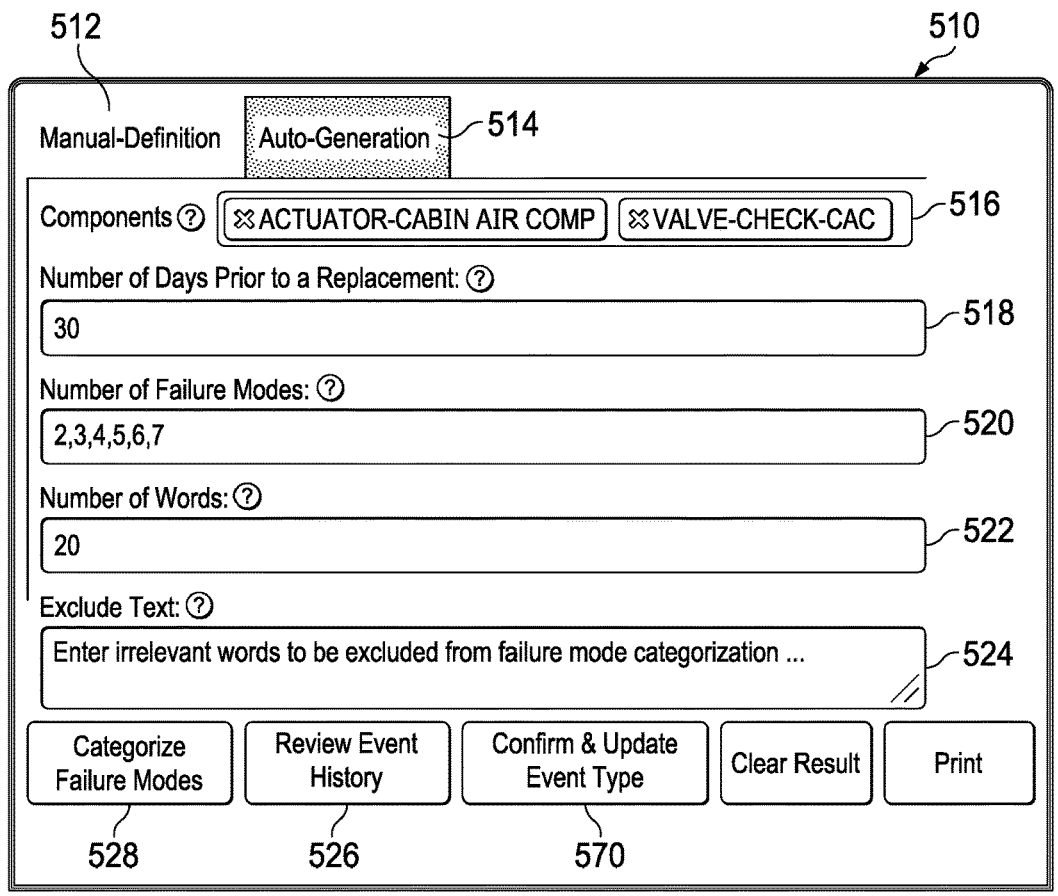
FIG. 5 is a diagram of an illustrative maintenance event categorization graphical user interface (GUI).

Selection tools are displayed in GUI 510, as shown in FIG. 5. The displayed tools include interactive elements allowing the user to make selections defining constraints on the data to be categorized and parameters of the categorization to be performed. In general, GUI 510 may include any number of selection boxes, dropdown menus, radio buttons, text input boxes, and/or any interactive element effective for input of desired constraints. All interactive elements may be displayed in a single interface view, or the GUI may include contextual menus, optional windows with additional tools, and/or any features known to one skilled in the art of interface design.

Selection 418 of maintenance events is received via a component selection box 516. The user may select any desired component or components from a list of all components having associated maintenance events in the received historical database, and maintenance events associated with the selected components will be included in selection 418. Selection 418 defines a subset of the maintenance events of the historical database to be clustered into categories.

In the present example, only replacements of the selected components are included in selection 418 by default. In some examples, the user may select additional and/or alternative types of associated events to include. The event types available for selection may depend on what events are recorded in the maintenance logs of the historical dataset, and how the events are logged. For example, the available types may include unplanned removal, scheduled removal, diagnostic test, system alert, and routine maintenance.

Selection 420 of a time period is received via time period selection box 518, in the form of a number of days. The user may input a time period prior to each maintenance event, from which text of the maintenance data will be analyzed. Selection 424 of a number of words is received via a word number selection box 522, and limits the number of key words from the maintenance log text which are displayed at step 444.

The user may also specify words to be excluded from the key words by entering such words into exclusion box 524. In this manner, the user may filter the key words used by the clustering model and avoid issues such as nuisance words or undesirably dominant words. Such exclusion may be particularly useful when repeating step 416 to refine the categories based on initial results.

Selection 422 of a number of categories is received via mode number selection box 520. The selected number of categories is used as a target for clustering, and may be a single number, a range of numbers, or a set of multiple numbers. In the latter cases, when selection 422 includes multiple numbers, the categorization module will apply a clustering model to generate a set of categories for each non-zero whole number in the range or set.

In the depicted example, the user has specified a range of 2 to 7 for the number of failure mode categories, and a 30 day time period leading up to each failure event for input text. The user has selected 20 as the number of key words to display in a significance comparison, and selected removal events associated with the actuators and check valves of the cabin air compressors to be categorized.

To assist in selections 418, 420, the user may use review event history button 526 to open a table of selected maintenance events. Once satisfied with the selections of step 416, the user may use failure mode categorization button 528 to proceed with step 426 of method 400.

Step 426 includes extracting a plurality of subsets of maintenance data from the selected time periods before the selected events. In other words, for each selected maintenance event, a subset of maintenance data is extracted from the selected time period preceding the event. The subset of maintenance data may include any and all text of the maintenance data, including but not limited to aircraft fault messages, maintenance messages, and/or maintenance log information.

Shop findings or shop tear-down reports, which are records from investigating, inspecting and testing failed components after removal from an aircraft, may be particularly useful, if available. Such records may be a valuable source of information concerning component failure modes, often containing text that is pertinent to a failure root cause such as a failed electrical component or mechanical wear. However, due to the time required for investigation, inspection, and testing, such reports are logged subsequent to the maintenance event. In order to include this source of information in the text associated with a maintenance event for analysis, the categorization module and/or predictive maintenance module design system may link, tag or otherwise associate such reports to preceding events as part of data integration or pre-processing. For example, such association may be performed as part of step 112 or step 310, as described above.

Step 428 includes applying a topic model to cluster text of the extracted subsets of maintenance data into topics and identify key words. The categorization module uses an embedded text analytics engine to automatically identify commonly occurring key words in the maintenance text. The engine applies a probabilistic topic model to cluster related words in the input text, in order to identify a set of topics and words key to each topic. The number of topics is the number of categories of selection 422, and the number of key words is the number of words of selection 424. Each topic is named as a maintenance event category, which in the present example may be referred to as a failure mode category. The categories are automatically named with the top identified key words. A user may manually rename the categories using the manual interface of GUI 510, under manual-definition tab 512.

Step 430 includes calculating a topic modelling score for each selected event and category. The scores for an event are calculated based on occurrence of the identified key words for each topic category in the extracted data subset from the time period preceding the event. Then step 432 includes assigning each selected event into a topic category based on the calculated scores for the respective event.

When selection 422 includes multiple numbers of categories, steps 428-432 are repeated for each number. That is, for each selected number a topic model is separately applied to the extracted maintenance data to generate a set of that number of topics. For each generated set of topics, topic modelling scores are calculated and each selected event is assigned to one of the set of topic categories based on the scores.

Step 434 includes calculating evaluation metrics for each of the generated topic categories. Specifically, sub-step 436 includes calculating an assignment probability score for each of the selected maintenance events and sub-step 438 includes calculating a quantitative measure of the significance or importance of each key word to the topic category. In other words, a measure of the probability or confidence of an assignment of each event to each topic category and a measure of importance of each key word to each topic is calculated. The assignment probability scores may be derived from the topic modelling scores calculated at step 430, and the significance of the key words may be calculated from coefficients of the topic model used to generate the categories. Specific details of the calculations may be dependent on the algorithm or type of topic model applied in step 428, and may use techniques or metrics known in the art of machine learning text analytics.

In cases where selection 422 includes multiple numbers of categories and steps 428-432 are repeated to generate multiple sets of topic categories, step 434 further includes calculating a relative performance score for each set of topic categories.

Figure 6:
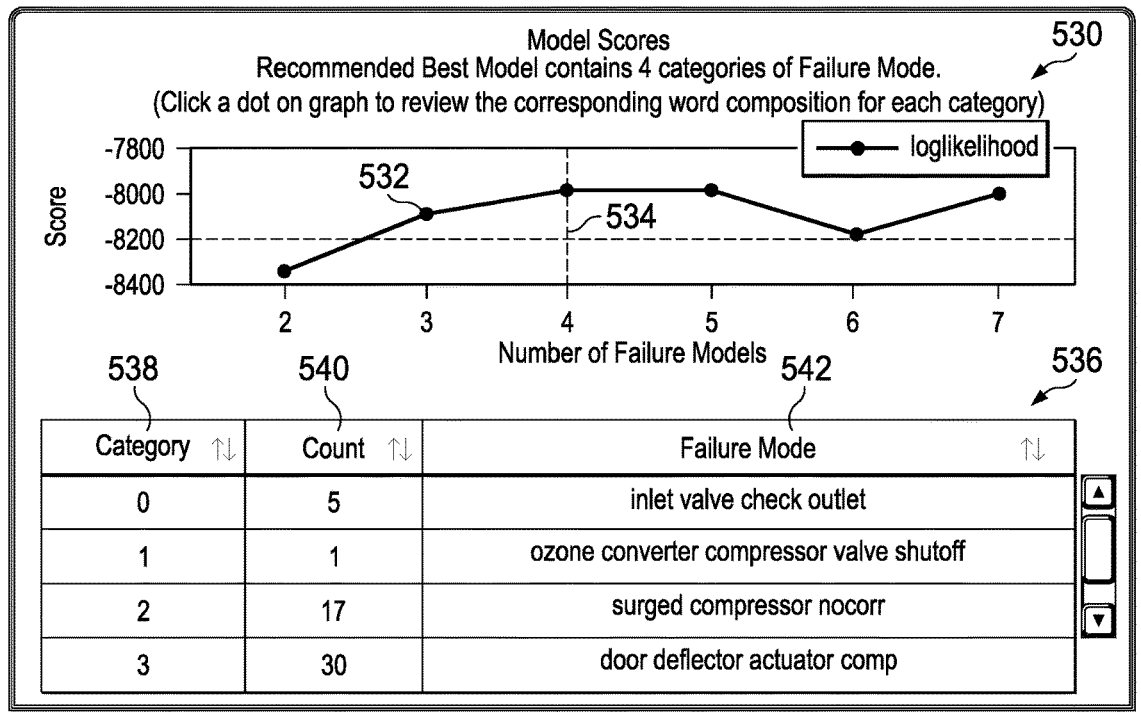
FIG. 6 includes a chart of scores for an illustrative plurality of sets of categories and a table of event categorizations in a selected set of categories, as displayed by the GUI of FIG. 5.
Figure 7:
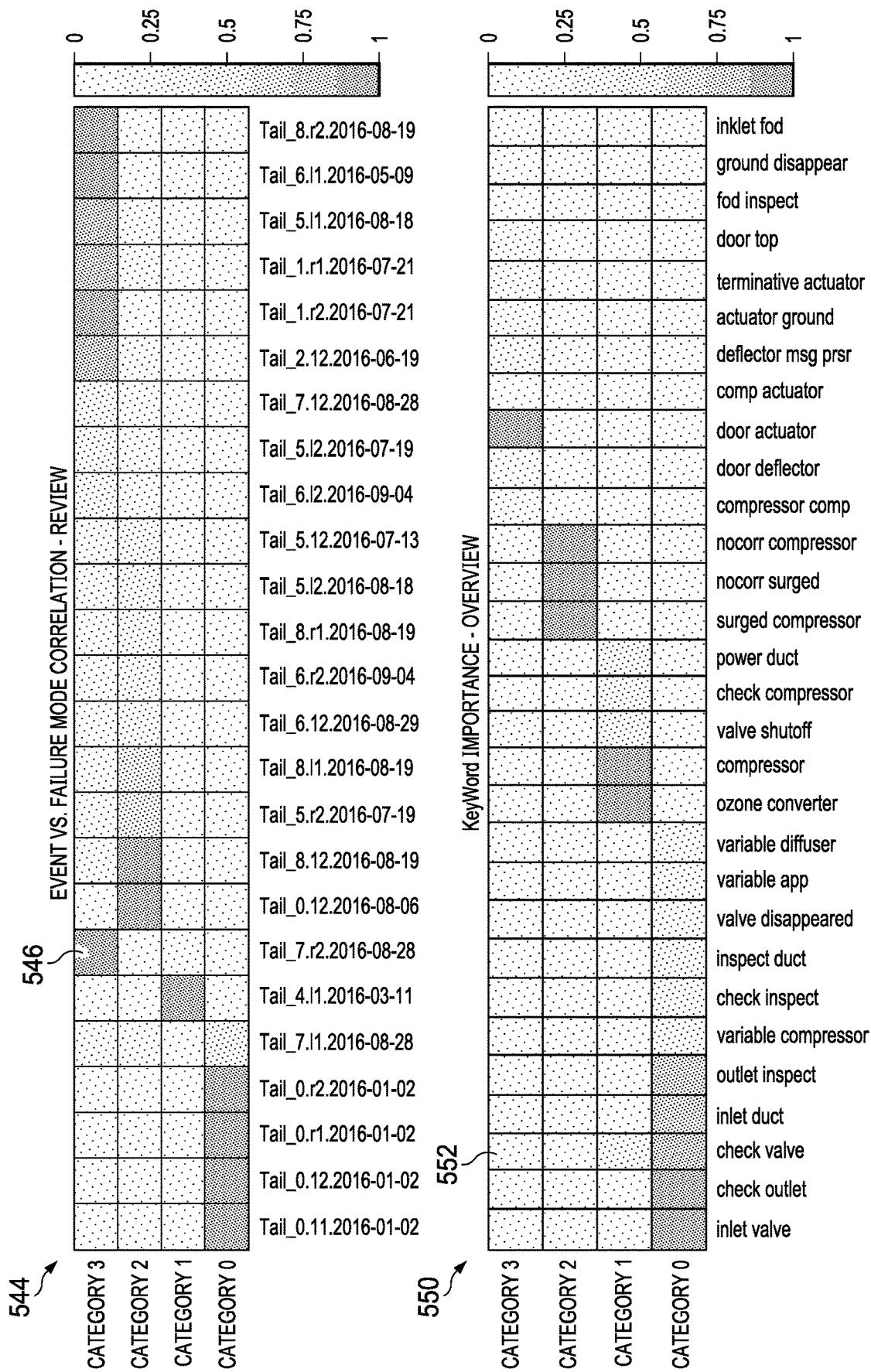
FIG. 7 includes an illustrative heat map of the importance of identified key words in category definition and another illustrative heat map of confidence level of assignment for each failure event for each category, as displayed by the GUI of FIG. 5.
Figure 8:
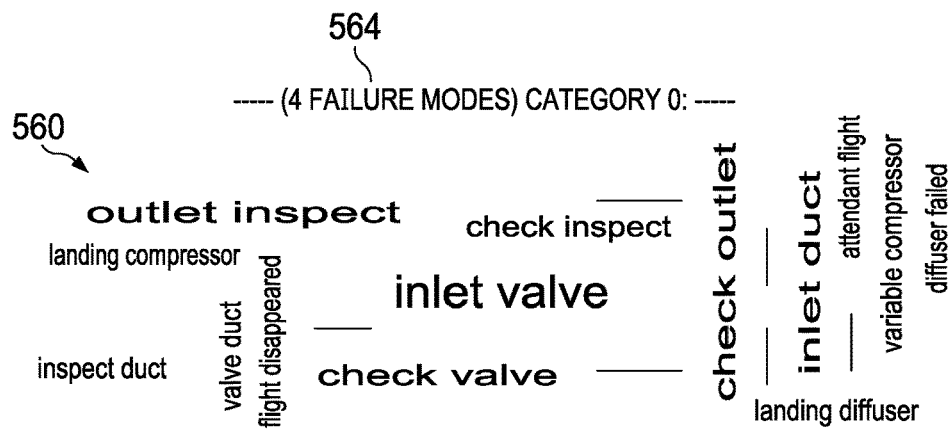
FIG. 8 includes an illustrative word cloud of identified key words and an illustrative bar chart of relative key word importance, for one category, as displayed by the GUI of FIG. 5.
Figure 8:
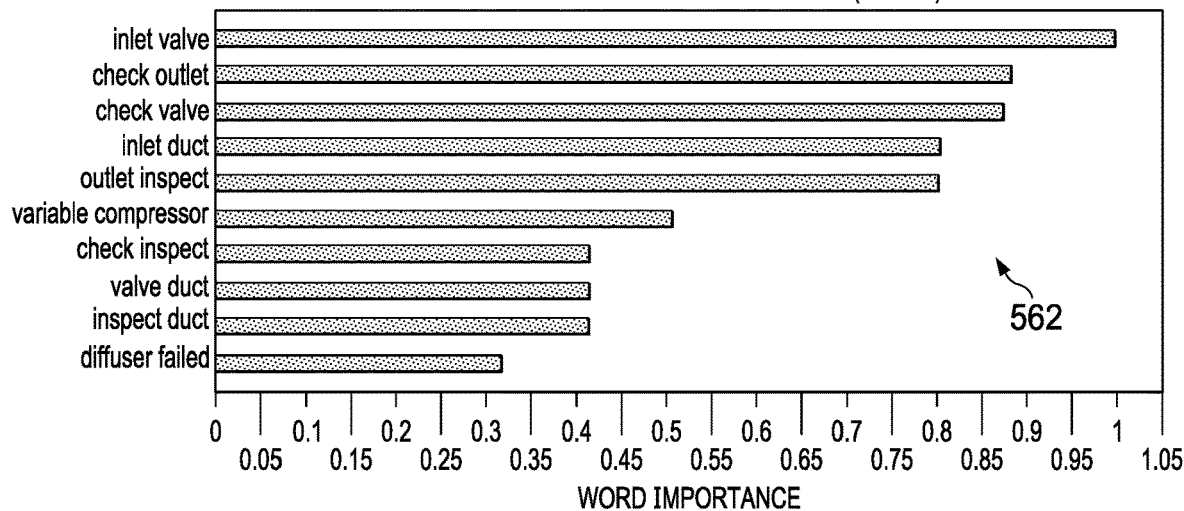

Step 440 includes displaying the generated topic categories and calculated evaluation metrics. Illustrative visualizations are depicted in FIGS. 6-8. In general, GUI 510 and the categorization module may be configured to provide any visualizations useful for evaluation of generated topic categories and event assignments. In some examples, the categorization module may display further charts, plots, heat maps, and/or graphs at user request.

In the depicted example, selection 422 includes six different numbers of categories and the first displayed visualization is a model score graph 530, shown in FIG. 6. The horizontal axis is the number of topic categories or failure modes generated by application of the topic model, and the vertical axis is the relative performance score for each set of generated topic categories as calculated at step 434. For each calculated score, a point 532 is graphed. The highest scoring set of categories may be indicated to the user in some manner. In the present example, the graph title includes a recommendation of the set of 4 categories.

Model score graph 530 allows the user to identify a number of categories best fitting any underlying patterns in the selected maintenance events. For example, replacements of a component that tends to fail due to either mechanical wear, electrical fault, or overheating may be most usefully clustered into three categories. Pre-cursor signatures in the operational data corresponding to each of the three failure modes may be thereby identified and separated out for most effective prediction of future failure. Assignment of the failure events into two or four categories instead might obscure the relationship between the operational data patterns and the component failures.

The user may assess overall performance of the selected numbers of categories using model score graph 530, and then assess individual generated categories using the visualizations displayed in sub-steps 442-446. Step 442 incudes displaying the topic categories, as generated at step 428. In the present example, to view additional detail about a specific set of categories, the user may select the corresponding score point 532 in model score graph 530. The selected set of categories is highlighted with a vertical indicator line 534 on graph 530, and a corresponding detail table 536 is displayed.

Detail table 536 includes one row for each generated category, and three columns. A first column 538 displays an ID number for each category, a second column 540 displays a count of the events assigned to the category, and a third column 542 displays the auto-generated name assigned to the category. In some examples, the table may include additional columns with other details regarding the categories. In some examples, a bar chart may be displayed with detail table 536, graphing event counts of column 540 for visual evaluation.

In the example of FIG. 6, the set of four categories is selected and displayed in detail table 536. The categories are assigned IDs 0-3. A total of 53 events are assigned, with category 3 having the most assigned events at 30 and category 1 having only one assigned event. A user skilled in aircraft engineering and repair may use the key words of the assigned category names to understand potential real-world failure modes or causes corresponding to the generated topic categories. The user may also use the event counts to identify topic categories most useful in prediction of future events. For instance, in the present example a predictive maintenance model developed to predict events of category 3 may be more useful than a model for the event of category 1.

Step 444 includes displaying a graphical representation of the probability scores, as calculated in step 436. In the present example, a heat map 544 of the scores of each event and category is displayed, as depicted in FIG. 7. The selected maintenance events are arranged along the horizontal axis of heat map 544, and the generated categories along the vertical axis. Each cell 546 represents the probability score or confidence level for an assignment of the corresponding event to the corresponding category. On cursor hover, a contextual label may be displayed for each cell, including the probability score and the respective maintenance event and category.

In the example of FIG. 6, heat map 544 shows that the assignment for many of the maintenance events is clear-cut, but that for a set of events in the middle of the time frame the assignments are somewhat ambiguous. The heat map may allow the user to quickly and visually review the confidence of event assignments, providing a more useful tool for evaluation of the assignments than a list of probability scores.

Step 446 includes displaying a graphical representation of the significance of the key words, as calculated in step 438. In the present example, a heat map 550 of the significance of each key word to each category is displayed, as depicted in FIG. 7. The identified key words are arranged along the horizontal axis of heat map 550, and the generated categories along the vertical axis. Each cell 552 represents the calculated quantitative measure of the significance or importance of the corresponding key word to the corresponding category. On cursor hover, a contextual label may be displayed for each cell, including the quantitative measure and the respective key word and category. Similarly to heat map 544, heat map 550 may allow the user to quickly and visually review the key words and their significance, providing a useful tool for evaluation of the topics and further insight into the text used to define the topics.

In the present example, the significance of the key words is further visualized for each category as depicted in FIG. 8. For each topic category, a word cloud 560 and a bar graph 562 are displayed with a title 564 identifying the respective category. In word cloud 560, a number of the most significant key words are displayed in font sizes corresponding to their relative significance. The number of key words displayed is the number of selection 424. In bar graph 562, the same key words are listed along the vertical axis with the specific value of their significance graphed along the horizontal axis.

In FIG. 8, the key words for category 0 are visualized, showing 'inlet valve', 'check outlet', 'check valve', and 'inlet duct' to have greatest significance. The word cloud and bar graph may assist the user in further understanding the maintenance data behind the category, and highlight nuisance words or undesirably dominant words influencing the category that can be excluded in a subsequent iteration of the method.

At decision 450, if the user is satisfied with the selected set of generated topic categories and event assignments, then the user may choose to proceed with step 414 as described above. Otherwise, the method may continue with steps 416-440 and/or 412 until the user is satisfied. That is, the user may make changes to the selections in the auto-generation interface under tab 514 of GUI 510 and/or edit the categories and event assignments in the manual interface under tab 512. The user may iterate on these results, and re-run the models with different settings until they are happy with the category definitions and assignment of events to categories.

Once satisfied, the user may trigger an update of an event table of the historical dataset with the final categorization, using confirmation button 570. As described above, Step 414 includes modifying the maintenance data with the event category assignments, and the modified data may then be accessible by other modules of a predictive maintenance model design system.

In some examples, the categorization module or a design system of which the module is a part may allow the user to save a set of generated categories, for later use or sharing with other users. The event categorization may be saved separately from the historical dataset alternatively or in addition to updating the event table of the historical dataset. For example, the categorization module may create distinct user sessions, allowing the user to work on investigating multiple questions separately, and/or multiple users to work independently. In some examples, the categorization module may support export of a generated set of categories, evaluations, and/or associated visualizations to another format, or to other data processing software.

When the categorization module is used as part of a predictive maintenance model design system, the user may choose to implement a predictive maintenance model for one or more of the failure mode categories. A choice of category may be based on a relative urgency or priority of the set of failure modes as determined by their operational impact. In some examples, such operational impact (e.g. repair costs, flight disruptions/delays) may be quantified, allowing display of an automatic assessment of failure mode priority with quantified economic and/or operational impacts.

C. Illustrative Feature Evaluation Module

As shown in FIGS. 9-13, this section describes an illustrative feature evaluation module, having a graphical user interface (GUI) 710, and an associated computer implemented method of operational data feature evaluation. The feature evaluation module may be part of and/or a submodule of an exploration module of a predictive maintenance model design system such as exploration module 216, described above. The feature evaluation module may be used to perform steps 332 and/or 316 of process 300, also described above. GUI 710 may be an example of GUI 226, as also described above.

The feature evaluation module is configured to enable a user such as an engineering analyst to compare relative importance of multiple data features in large sets of recorded sensor data, and correlation of the data features to maintenance events. Instead of individually reviewing and comparing hundreds or thousands of candidate features, the user may review an automatic scoring and ranking of selected features by the strength of the feature's correlation to equipment failures or other maintenance events. The feature evaluation module determines the scoring and ranking with an embedded supervised machine learning model.

Such automatic evaluation may allow a user to rapidly assess the predictive value of any number of data features, without need for any programming. By identifying the most important features, analysis may be focused and an algorithm discovery process expedited. In other words, the user can quickly narrow a large pool of possible data features down to a small set of features of highest significance.

In some examples, the identified significant data features may be used in training of anomaly detection algorithms to identify component degradation and predict failures in advance. In some examples, the data features may be used in other machine learning applications for any desired analysis of recorded operational data. For instance, an algorithm may be trained to classify flight activities according to likely wear and tear on one or more aircraft components. For another instance, an algorithm may be trained to identify pre-cursors to safety-related events such as tail strikes.

Figure 10:
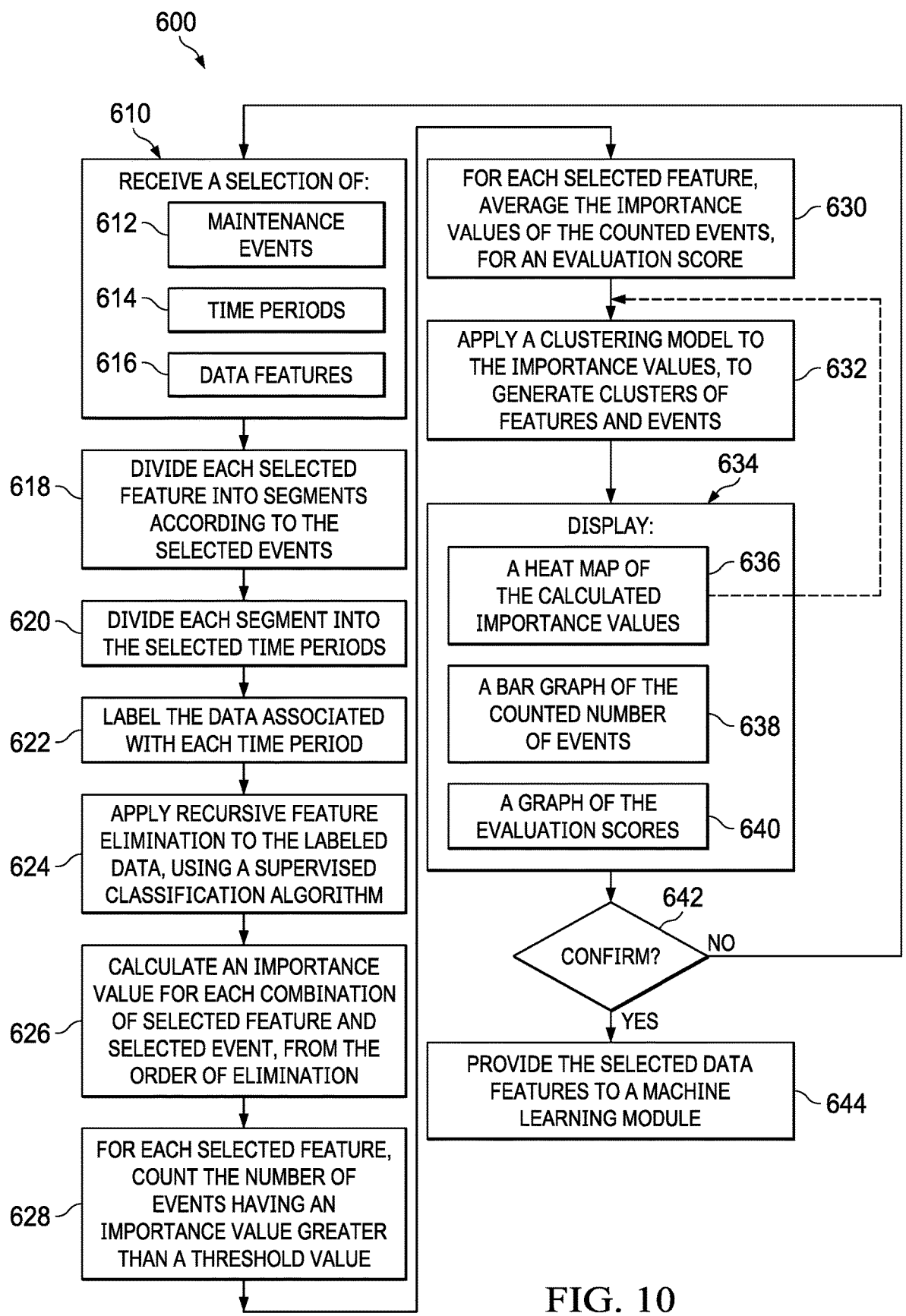
FIG. 10 is a first flow chart depicting steps of an illustrative data feature evaluation process.

FIG. 10 is a flow chart depicting steps of method 600 of operational data feature evaluation. The feature evaluation module receives selections from and displays data plots to the user through GUI 710, shown in FIGS. 11-13.

To begin method 600, the feature evaluation module may receive or access a historical dataset of operational and maintenance data. The dataset may consist of time-labeled historical maintenance and sensor data integrated from separate databases, cleaned, and pre-processed for display and analysis, as described in reference to step 310, above.

In the present example the feature evaluation module is configured for use with data from a fleet of aircraft. The operational data include flight sensor data, digitally recorded by the fleet of aircraft and including readings such as temperatures, pressures, electrical currents, and actuator positions. The operational data include discrete samples in a plurality of time series, each time series recorded over the course of a flight. The maintenance data include records of maintenance events such as scheduled or unplanned component replacements, routine maintenance, and repair work. The records may include aircraft maintenance messages, aircraft fault messages, airline maintenance log entries, crew incident write-ups, shop findings, and/or shop tear-down reports.

In some examples, maintenance events of the maintenance data may be tagged, labeled, or otherwise categorized. For instance, a maintenance event categorization module may be used to perform a categorization method such as method 400 described above to divide unplanned removal events into failure modes based on analysis of maintenance record text preceding the events.

Step 610 includes receiving selections of maintenance events, data features, and analysis parameters. The selections are received from the user, via GUI 710. Some selections may be required before proceeding with analysis in steps 618-632, while other selections may be optional additional constraints. Step 610 may be repeated many times in method 600. The data feature evaluation method may be described as iterative, with repeated selection of constraints and analysis of data features. The user may use insights gained from visualizations of an analysis to inform a subsequent selection of constraints, and so on.

Figure 11:
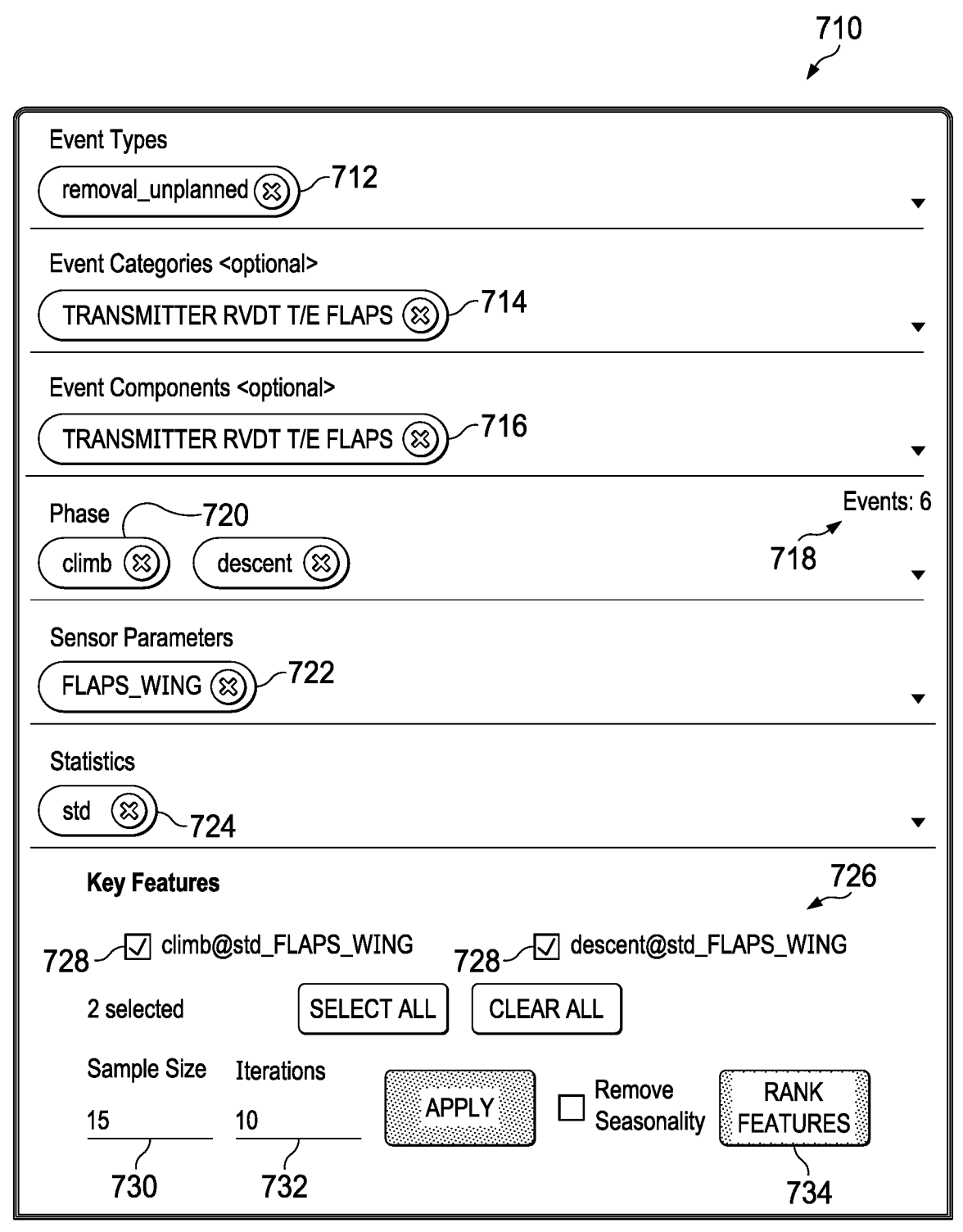

Selection tools are displayed in GUI 710, as shown in FIG. 11. The displayed tools include interactive elements allowing the user to make selections defining constraints on the data features to be evaluated and parameters of the analysis to be performed. In general, GUI 710 may include any number of selection boxes, dropdown menus, radio buttons, text input boxes, and/or any interactive element effective for input of desired constraints. All interactive elements may be displayed in a single interface view, or the GUI may include contextual menus, optional windows with additional tools, and/or any features known to one skilled in the art of interface design.

Selection 612 is of a subset of maintenance events from the maintenance data of the historical dataset, to be used in data feature evaluation. The subset of maintenance events of selection 612 are defined by selected constraints on event types, categories, and components. In the present example, at least one maintenance event type must be selected to proceed with method 600, but the category and component constraints are optional.

An event type constraint is received via a type selection box 712. The user may select any desired number of types. The event types available for selection may depend on what events are recorded in the maintenance logs of the historical dataset, and how the events are logged. For example, the available types may include unplanned removal, scheduled removal, diagnostic test, system alert, and routine maintenance.

An event category constraint may be received via a category selection box 714. The user may select any desired number of event categories. The event categories may be part of the received historical dataset, may be generated by another module of a predictive maintenance model design system such as the maintenance event categorization module described in Example B, and/or may be manually entered by the user using another interface of GUI 710. In some examples, the categories available for selection may depend on the event types selected in box 712. For instance, unplanned removal events may be divided into electrical failure, thermal failure, mechanical failure, and unknown failure.

A component constraint is received via a component selection box 716. The user may select any desired number of components. The components available for selection may depend on what events are recorded in the maintenance logs of the historical dataset, and what data is associated with a recorded event. For example, each event may be associated to an aircraft component in the historical dataset, and only components with associated events may be listed for selection. For another example, all components mentioned in maintenance log text associated with an event may be listed for selection.

In the example of FIG. 5, events of the unplanned removal type are selected. The events are constrained to both a category and a component designated 'TRANSMITTER RVDT T/E FLAPS'. GUI 710 includes an event count 718 indicating the number of events selected by the entered constraints. In the present example, six unplanned removal events are selected. In general, additional selections for a given constraint may select additional events, while opting to include any selections for the category or component constraints may reduce the number of selected events. In other words, by default all categories and components are included.

Selection 614 is of time periods associated with the selected maintenance events, from which operational data will be sampled for evaluation of data features. The time periods may indicate healthy and degraded periods for a relevant component or system. In the present example, selection 614 is received from a data visualization module of the predictive maintenance model design system. In some examples, GUI 710 may include selection boxes for input of two time period thresholds as a number of days. In some examples, the time periods may be pre-defined and/or automatically selected by the feature evaluation module.

Selection 616 is of two or more data features to be evaluated. Due to the relative nature of the analysis and metrics, a selection of at least two data features is required to proceed with method 600. However, no upper limit is placed on the number of data features that can be selected. A user may select hundreds, thousands, or more features for analysis. A user may choose to limit the number of data features selected according to processing power of a computer or other data processing system used to run the feature evaluation module, in order to complete analysis within an acceptable time period.

In the present description, the term 'data feature' is used to describe a subset of records of the operational data of the historical dataset, extracted, processed, and/or otherwise prepared for use in a machine learning method. The data features of selection 616 are chosen by the user from a set of features defined by selected constraints on sensors parameters, flight phases, and aggregating statistical functions.

A phase constraint is received via a phase selection box 720. The user may select any desired number of phases. As discussed above, trending of recorded sensor data can be difficult due to large variations in sensor values that occur as a result of equipment operational cycles. In the present example, recorded aircraft flight data varies according to flight phases such as climb, cruise, and descent. To address this, sensor data from each flight is divided according to flight phases and data features are each defined for a single flight phase. In other words, the operational data is divided into a plurality of phase-dependent data subsets, each subset corresponding to one of the flight phases. In examples where the feature evaluation module is configured for use with equipment other than aircraft, the operational data may be divided according to other operational phases such as engine warm-up, full power, and idle.

A sensor constraint is received via a sensor parameter selection box 722. The user may select any desired number of sensor parameters. The term 'sensor parameter' is used here to refer to an attribute of the operational data indicating a specific sensor or a type of sensor by which values of a record were recorded. The sensor parameters available for selection may depend on what flight sensor data are recorded in the telemetry of the historical dataset, and how the sensor data is organized and/or recorded. For example, an aircraft may include multiple sensors of the same type in different positions on the aircraft, readings from which may be associated with multiple sensor parameters or a single sensor parameter.

An aggregating statistical function constraint is received via a function selection box 724. Similar to the above described difficulty in data analysis due to operational phase variance, effective analysis of trends can be hampered by the division of the operational data into a plurality of distinct time series, or flights. To avoid this difficulty, the data features of selection 616 are aggregate. For each flight, records in the selected phase-dependent data subset associated with the selected sensor are aggregated according to the selected statistical function. In the present example, the available aggregating statistical functions include average, minimum, maximum, standard deviation, median, upper quartile value, and lower quartile value. The user may select any desired number of functions.

The selected constraints define a set of possible data features, all of which are displayed in a feature list 726. At least one of each constraint must be selected by the user, to define the set of possible data features. Each combination of a flight phase, a sensor parameter and an aggregating statistical function defines a data feature, which is automatically named according to the corresponding constraints. Associated with each feature of list 726 is a checkbox 728. The user may select from the defined features of list 726 using checkboxes 728.

In some examples, feature list 726 may also include data features defined in other modules of a predictive maintenance model design system. For instance, any custom features defined at step 330 as defined above may be included in feature list 726. For another instance, features automatically generated by machine learning module 218 or pre-defined features associated with a component or maintenance issue selected by the user may be included in the feature list.

In the present example, the climb and descent phases are selected in box 720, the sensor parameter FLAPS_WING for recorded position of wing flaps during flight is selected in box 722, and the standard deviation function is selected in box 724. Feature list 726 includes the two resulting data features climb@std_FLAPS_WING and descent@std_FLAPS_WING. Both checkboxes 728 are checked, thereby selecting both features for analysis.

In some examples, GUI 710 may include an interface or interactive element supporting import of automatically generated and/or custom defined aggregated operational-phase features received from another source, such as a feature creation module.

In the depicted example, GUI 710 further allows the user to optionally specify parameters of the feature evaluation, at selection step 610. More specifically the GUI includes a sample size input box 730 and an iterations input box 732. The selected sample size determines a number of flights sampled from labeled data sets, and the selected iterations determine the number of times sampling is performed, at step 624 as described further below. Once satisfied with their selections, the user may complete step 610 and trigger steps 618-634 of method 600 with ranking button 734.

In some examples, GUI 710 may provide additional configuration options to the user. For instance, data pre-processing parameters such as normalization grouping or smoothing window may be selectable. In the present example, the feature evaluation module allows the user to optionally remove seasonal bias before evaluation. A user may repeat method 600 with and without removal of seasonal bias, to assess the impact of such bias on the evaluation results.

Figure 9:
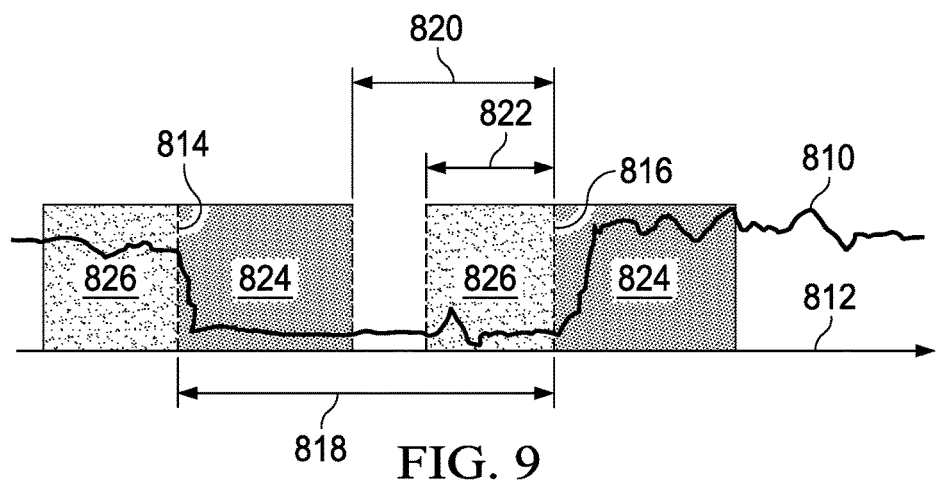
FIG. 9 is schematic diagram of a data feature profile over time, segmented according to maintenance events and then divided into healthy, degraded, and uncertain status time periods.

Step 618 includes dividing operational data of each selected data feature into segments, according to the selected maintenance events. Each data segment may be associated with an immediately following event. An illustrative data feature profile 810 is depicted in FIG. 9, with respect to a time axis 812. A first maintenance event 814 and a second maintenance event 816 are indicated as vertical lines. Between first event 814 and second event 816, a segment 818 is defined. Segment 818 is associated with second maintenance event 816. Data of profile 810 recorded up to first event 814 is also considered a segment, as is data of the profile recorded following second event 816. Each data feature is similarly segmented according to the selected events.

Step 620 includes dividing each segment of operational data into the selected time periods. That is, each segment is divided into multiple time periods according to a selected threshold time, or selected time relationship to the associated maintenance event. In the present example, selection 614 includes first and second threshold times such as x-number of days and y-number of days, and each segment is divided into three time periods. As shown in FIG. 9 for segment 818, first time threshold 820 and second time threshold 822 are measured backward along time axis 812 from associated second maintenance event 816. The sensor data of segment 818 prior to first threshold 820 is assigned to a first time period, designated as a healthy time period 824. The sensor data of segment 818 following second threshold 822 is assigned to a second time period, designated as a degraded time period 826.

In other words, sensor data in a period of time greater than x-number of days prior to a maintenance event is assumed to reflect healthy operation, while sensor data in a period of time less than y-number of days prior to the maintenance event is assumed to reflect degraded operation. All other sensor data of segment 818 may be assigned to a third time period, designated as an uncertain status time period.

Step 622 includes labelling the data associated with each time period. Each selected data feature may be prepared for supervised machine learning, with the addition of qualitative labels. In the present example, the assigned qualitative labels are 'healthy' and 'degraded'. More specifically, all sensor data assigned to a time period designated as healthy is labelled as healthy, and all sensor data assigned to a time period designated as degraded is labelled as degraded. The selected data features may be extracted from the historical dataset for division, labelling, and subsequent processing in steps 618-634, without change to the historical dataset.

The depicted time periods are labeled for use with unplanned removal events, to assign healthy and degraded labels based on an assumption of component degradation leading to the unplanned removal. In the present example, the feature evaluation module applies only the healthy and degraded labels. In some examples, the feature evaluation module may allow input of other labels, and the user may define any informative time periods prior to a selected event type. For example, a user investigating effects of routine maintenance on aircraft performance might designate time periods corresponding to theorized optimal maintenance intervals to visualize operational data from flights outside such intervals.

Step 624 includes applying recursive feature elimination (RFE) to the labeled data, using a supervised classification algorithm. The step may also be described as training a classification model on the labeled data using a supervised machine learning method, ranking the selected data features by predictive importance, eliminating a least important feature, and re-training the classification model. Training, ranking, and elimination are repeated until only one of the selected data features remains. RFE may be applied to each data segment, to evaluate importance of the selected data features in predicting each of the selected maintenance events. In some examples, an alternative feature ranking technique may be used in place of and/or in addition to RFE.

To avoid prohibitive processing times, the model is trained on samples from the healthy and degraded data labeled at step 622 rather than all labeled data. Larger samples and a greater number of samples may produce more accurate results, but increase the processing load. A pre-selected compromise level of sampling may be used by default, but the user may also directly specify sample size and iterations, as described above. Such tuning may allow the user to survey a large number of data features quickly, then perform more accurate evaluation of a smaller number of the top data features. Also, users with data science experience may be thereby able to tune the feature evaluation as desired, while users with less familiarity may be able to rely on the provided default values without need for adjustment.

Step 626 includes calculating an importance value for each combination of selected data feature and selected maintenance event, from the order of elimination. For each data segment, the RFE of step 624 determines an order in which the selected data features are eliminated. A value or score for each data feature is calculated from that order of elimination, for each data segment and associated maintenance event. In some examples, importance rankings and/or coefficients from the trained supervised classification models used in the RFE may also be used to calculate the importance scores. In other words, for each maintenance event, the features are each given an importance value which signifies the feature's relative importance in predicting the event within the "degraded" time period. The importance value is used to provide quantitative results of the data feature evaluation. In examples where an alternative feature ranking technique is used, the importance value may be calculated according to the results of the feature ranking.

Step 628 includes counting the number of maintenance events having an importance value greater than a threshold value, for each selected data feature. The threshold value may depend on the specific method by which the importance values are calculated in step 626, but may be selected to exclude events for which the data feature does not have significant importance. In some examples, the threshold value may be selectable by the user.

Step 630 includes averaging the importance values of the counted maintenance events for each selected data feature, to get an evaluation score for each data feature. The evaluation score may indicate a broader importance of the data feature in predicting all of the selected maintenance events. A higher score indicates greater importance in predicting maintenance events.

Step 632 includes applying a clustering model to the calculated importance values, to generate clusters of features and events. A default cluster size may be used as a target for a first application of the model. Subsequently, target size may be adjusted by the user, in the display of GUI 710 at step 634. In the present example, the features are clustered independently from the events, using a 1-dimensional clustering model. In some examples, the features and events may be clustered together using a 2-dimensional clustering model. In general, any effective clustering algorithm or method may be applied to the calculated importance values and associated features and events.

Step 634 includes displaying the results of steps 610-632 in GUI 710. More specifically, the quantities calculated in steps 626-632 may be displayed. In the present example, the results are displayed as a heat map, a bar graph, and a line graph. In general, any graphs, charts, or plots useful for visualizing the calculated values, counts, and/or scores may be displayed.

Figure 12:
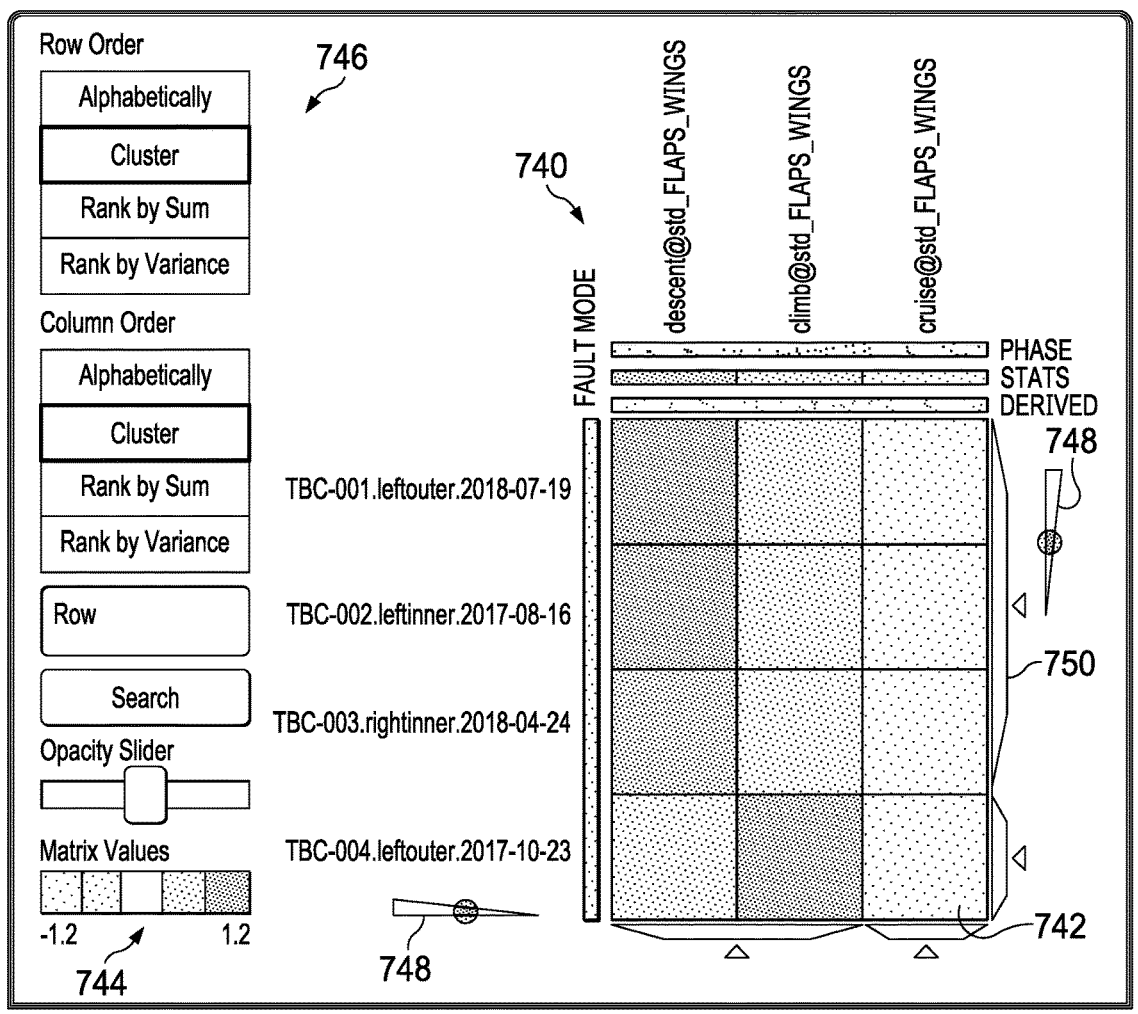
FIG. 12 is an illustrative heat map of relative importance of each data feature in predicting each failure event, as displayed by the GUI of FIG. 11.

Sub-step 636 includes displaying a heat map 740 of the importance values calculated at step 626, as depicted in FIG. 12. The selected data features are shown along a horizontal axis of heat map 740, and the selected maintenance events on a vertical axis. In other words, data features are shown as columns of the heat map, and maintenance events are shown as rows of the heat map. Each row and column includes a label of the corresponding feature or event. In the depicted example, only three data features and four maintenance events are selected and displayed. In general, any number of features and/or events may be selected for display in heat map 740. For instance, upwards of hundreds of features may be evaluated and displayed.

Heat map 740 includes a cell 742 for every combination of data feature and maintenance event. Each cell 742 displays the importance value calculated for the corresponding data feature and maintenance event as a grey value or pattern density according to a temperature scale 744. The heat map visualization may allow the user to rapidly determine which features are most important to predicting maintenance events. Heat map 740 may be particularly useful for evaluating a large number of data features at once, to efficiently narrow a wide field of potential features.

The data features and maintenance events are organized in heat map 740 according to a selection by the user in order menu 746. The user may select an order independently for the rows and for the columns of the heat map. In the depicted example, the rows and columns can each be ordered alphabetically by name, in the clusters generated at step 632, in increasing order of a total of all associated importance values, or in increasing order of a calculated variance in associated importance values.

Heat map 740 is depicted with both the rows and columns ordered according to the clusters generated at step 632. That is, the maintenance events are organized in the heat map in the generated clusters of events, and the data features are organized in the heat map in the generated clusters of features. The clusters are ordered in increasing order of importance value. Each cluster is indicated by a bracket 750 adjacent heat map 740. Clusters of associated features, those features having similar importance in event prediction, and clusters of associated failure events may be thereby visualized and identifiable by the user. The clustered view may also facilitate rapid differentiation of promising candidate features from a wide field of potential features.

GUI 710 further includes a slider 748 associated with each of the rows and columns. The user may select a position of each slider to alter a target cluster size, and trigger a repeat of clustering step 632 and display of heat map 740 according to the newly generated clusters. In the present example, additional information on the maintenance events and data features is also depicted adjacent the labels of heat map 740. For example, a failure mode of each maintenance event and a flight phase of each data feature are indicated by a colored or patterned tag adjacent the row and column label, respectively.

Figure 13:
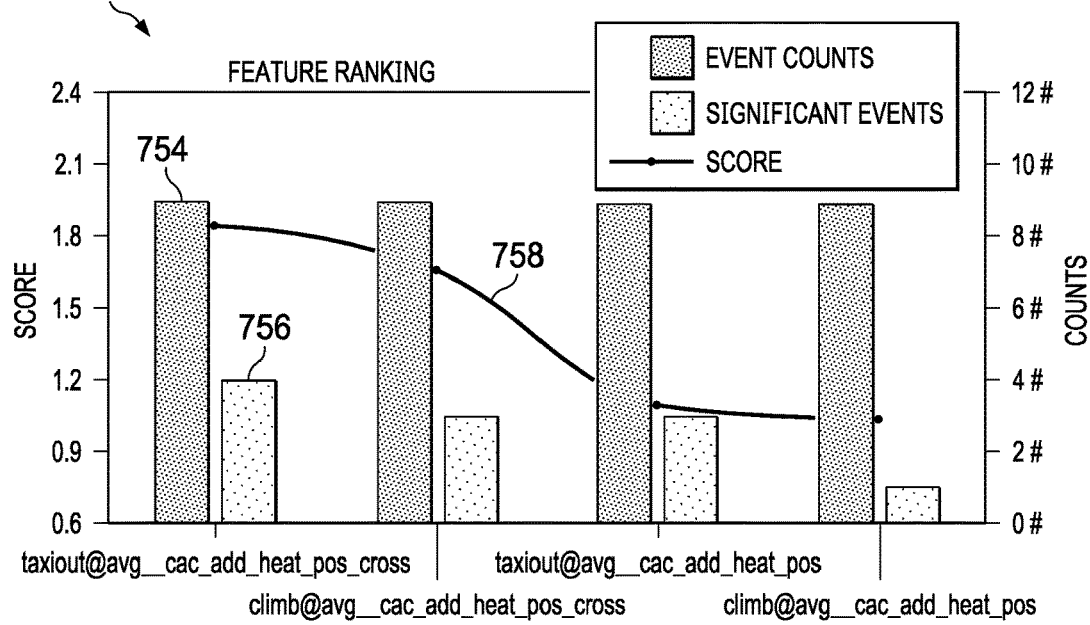
FIG. 13 is an illustrative graph of data feature evaluation scores and event counts, as displayed by the GUI of FIG. 11.

Sub-step 638 includes displaying a bar graph of the number of events counted at step 628. Sub-step 640 includes displaying a graph of the evaluation scores calculated at step 630. In the present example, the counted number of events and evaluation scores are both displayed on one ranking graph 752, as depicted in FIG. 13.

Ranking graph 752 compares event counts and evaluation scores for one cluster of data features. Display of the ranking graph may be triggered by the user selecting a cluster of data features using the corresponding bracket 750. In the present example, the three measures of the cluster of data features are displayed, including the number of failure events successfully predicted, the number of events counted at step 628, and the evaluation score calculated at step 632. The data features are arranged along a horizontal axis, and both the event counts and evaluation score are graphed along a vertical axis. Scale for the event counts is labeled at the left-hand side and scale for the evaluation score is labeled at the right-hand side.

Ranking graph 752 includes event count bars 754, significant event bars 756, and a score line 758. For each data feature, event count bar 754 represents the number of applicable maintenance events remaining after eliminating events with large gaps in the associated historical data and events with a importance value less than or equal to zero. Each significant event bar 756 represents the number of events counted in step 628, with importance value greater than the selected threshold value. In the depicted example, events with an importance value greater than 0.5 are counted as significant events. Score line 758 is defined between a point for each feature, the point representing the evaluation score calculated at step 630, the median of the importance values for the significant events represented by corresponding bar 756.

At decision 642, if the user is satisfied with the selected data features, then they may choose to proceed with step 644. Otherwise, the method may continue with steps 610-634 until the user is satisfied. That is, the user may selected and evaluate different sets of data features until achieving a desired set of one or more data features. Such evaluation of potential data features over selected subsets of the historical dataset may allow the user to confirm that the data features exhibit a meaningful relationship to maintenance events before committing to development of a predictive model based on the features, which may in turn save computation costs and user time.

At step 644 the method includes providing the selected data features to a machine learning module, such as module 218, described above. That is, the extracted feature data may be provided to the module. In some examples, the feature evaluation module may output the extracted feature data for use with independent machine learning software, or access by custom-written model training code.

The feature evaluation module or a design system of which the module is a part may allow the user to save a set of data features exported at step 644, for later use or sharing with other users. For example, the feature evaluation module may create distinct user sessions, allowing the user to work on investigating multiple questions separately, and/or multiple users to work independently. In some examples, the feature evaluation module may support export of a received set of selections, evaluations, and/or associated visualizations to another format, or to other data processing software.

D. Illustrative Data Processing System

Figure 14:
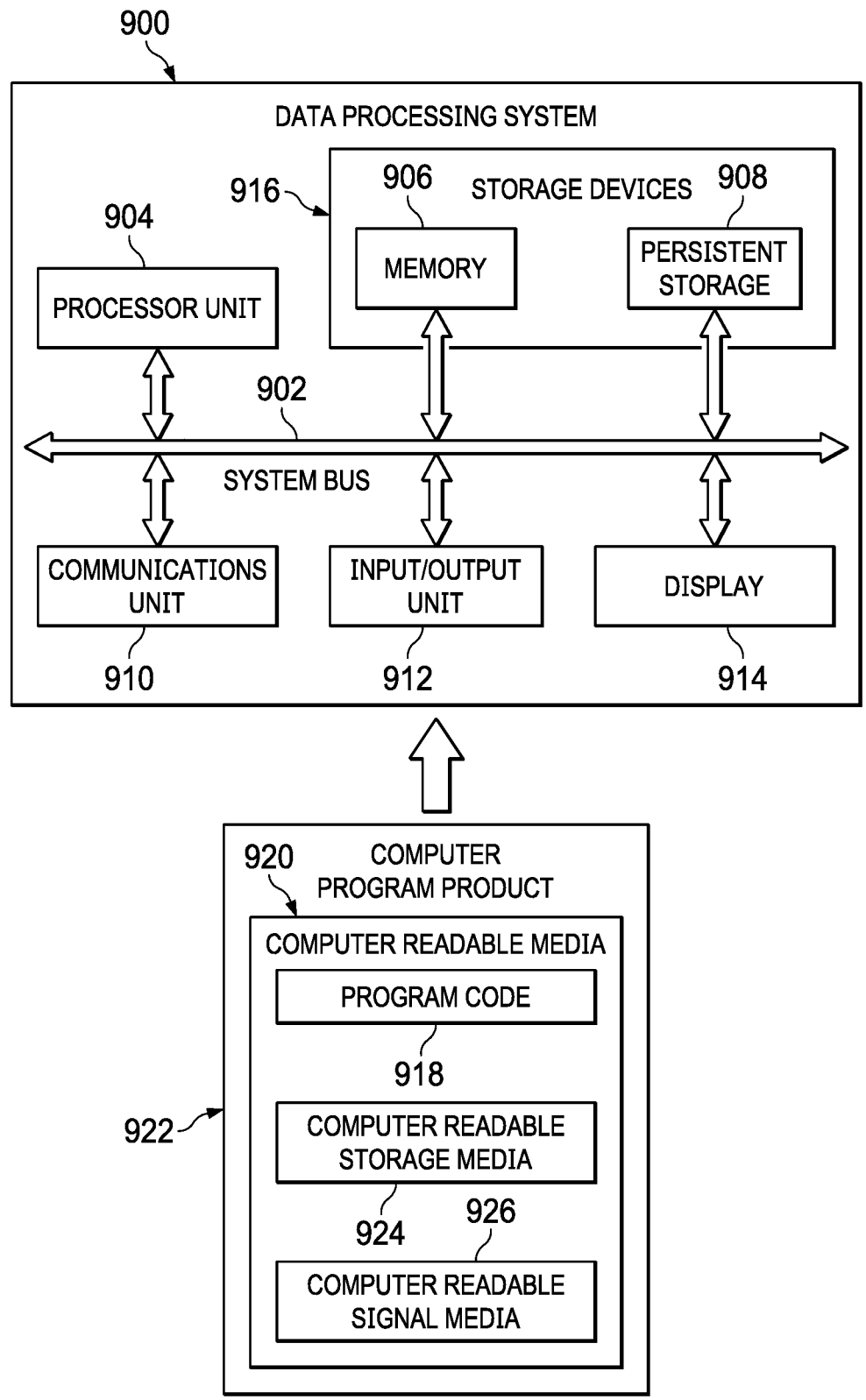
FIG. 14 is a schematic diagram of an illustrative data processing system suitable for use with aspects of the present disclosure.

As shown in FIG. 14, this example describes a data processing system 900 (also referred to as a computer, computing system, and/or computer system) in accordance with aspects of the present disclosure. In this example, data processing system 900 is an illustrative data processing system suitable for implementing aspects of the predictive maintenance model generation, maintenance event categorization, and data feature evaluation methods described above. More specifically, in some examples, devices that are examples of data processing systems (e.g., servers, tablets, personal computers) may run one or more modules of a predictive maintenance model design system to execute the methods described above.

In this illustrative example, data processing system 900 includes a system bus 902 (also referred to as communications framework). System bus 902 may provide communications between a processor unit 904 (also referred to as a processor or processors), a memory 906, a persistent storage 908, a communications unit 910, an input/output (I/O) unit 912, and/or a display 914.

Processor unit 904 serves to run instructions that may be loaded into memory 906. Processor unit 904 may comprise a number of processors, a multi-processor core, and/or a particular type of processor or processors (e.g., a central processing unit (CPU), graphics processing unit (GPU), etc.), depending on the particular implementation. Further, processor unit 904 may be implemented using a number of heterogeneous processor systems in which a main processor is present with secondary processors on a single chip.

Memory 906 and persistent storage 908 are examples of storage devices 916. A storage device may include any suitable hardware capable of storing information (e.g., digital information), such as data, program code in functional form, and/or other suitable information, either on a temporary basis or a permanent basis. Storage devices 916 also may be referred to as computer-readable storage devices or computer-readable media.

Persistent storage 908 may contain one or more components or devices. For example, persistent storage 908 may include one or more devices such as a magnetic disk drive (also referred to as a hard disk drive or HDD), solid state disk (SSD), an optical disk drive such as a compact disk ROM device (CD-ROM), flash memory card, memory stick, and/or the like, or any combination of these. One or more of these devices may be removable and/or portable, e.g., a removable hard drive.

Input/output (I/O) unit 912 allows for input and output of data with other devices that may be connected to data processing system 900 (i.e., input devices and output devices). For example, an input device may include one or more pointing and/or information-input devices such as a keyboard, a mouse, touch screen, microphone, digital camera, and/or the like. These and other input devices may connect to processor unit 904 through system bus 902 via interface port(s) such as a serial port and/or a universal serial bus (USB).

Output devices may use some of the same types of ports, and in some cases the same actual ports, as the input device(s). For example, a USB port may be used to provide input to data processing system 900 and to output information from data processing system 900 to an output device. Some output devices (e.g., monitors, speakers, and printers, among others) may require special adapters. Display 914 may include any suitable human-machine interface or other mechanism configured to display information to a user, e.g., a CRT, LED, or LCD monitor or screen, etc.

Communications unit 910 refers to any suitable hardware and/or software employed to provide for communications with other data processing systems or devices. While communication unit 910 is shown inside data processing system 900, it may in some examples be at least partially external to data processing system 900. Communications unit 910 may include internal and external technologies, e.g., modems, ISDN adapters, and/or wired and wireless Ethernet cards, hubs, routers, etc. Data processing system 900 may operate in a networked environment, using logical connections to one or more remote computers.

Instructions for the operating system, applications, and/or programs may be located in storage devices 916, which are in communication with processor unit 904 through system bus 902. In these illustrative examples, the instructions are in a functional form in persistent storage 908. These instructions may be loaded into memory 906 for execution by processor unit 904. Processes of one or more examples of the present disclosure may be performed by processor unit 904 using computer-implemented instructions, which may be located in a memory, such as memory 906.

These instructions are referred to as program instructions, program code, computer usable program code, or computer-readable program code executed by a processor in processor unit 904. The program code in the different examples may be embodied on different physical or computer-readable storage media, such as memory 906 or persistent storage 908. Program code 918 may be located in a functional form on computer-readable media 920 that is selectively removable and may be loaded onto or transferred to data processing system 900 for execution by processor unit 904. Program code 918 and computer-readable media 920 form computer program product 922 in these examples. In one example, computer-readable media 920 may comprise computer-readable storage media 924 or computer-readable signal media 926.

Computer-readable storage media 924 may include, for example, an optical or magnetic disk that is inserted or placed into a drive or other device that is part of persistent storage 908 for transfer onto a storage device, such as a hard drive, that is part of persistent storage 908. Computer-readable storage media 924 also may take the form of a persistent storage, such as a hard drive, a thumb drive, or a flash memory, that is connected to data processing system 900. In some instances, computer-readable storage media 924 may not be removable from data processing system 900.

In these examples, computer-readable storage media 924 is a non-transitory, physical or tangible storage device used to store program code 918 rather than a medium that propagates or transmits program code 918. Computer-readable storage media 924 is also referred to as a computer-readable tangible storage device or a computer-readable physical storage device. In other words, computer-readable storage media 924 is media that can be touched by a person.

Alternatively, program code 918 may be transferred to data processing system 900, e.g., remotely over a network, using computer-readable signal media 926. Computer-readable signal media 926 may be, for example, a propagated data signal containing program code 918. For example, computer-readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative examples, program code 918 may be downloaded over a network to persistent storage 908 from another device or data processing system through computer-readable signal media 926 for use within data processing system 900. For instance, program code stored in a non-transitory computer-readable storage medium in a server data processing system may be downloaded over a network from the server to data processing system 900. The computer providing program code 918 may be a server computer, a client computer, or some other device capable of storing and transmitting program code 918.

The different components illustrated for data processing system 900 are not meant to provide architectural limitations to the manner in which different examples may be implemented. One or more examples of the present disclosure may be implemented in a data processing system that includes fewer components or includes components in addition to and/or in place of those illustrated for computer 900. Other components shown in FIG. 14 can be varied from the examples depicted. Different examples may be implemented using any hardware device or system capable of running program code.

Illustrative Combinations and Additional Examples

This section describes additional aspects and features of predictive maintenance model design systems, computer implemented methods of predictive maintenance design, and computer programs product for generating predictive maintenance models, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A data processing system for generating predictive maintenance models, comprising:
   one or more processors;
   a memory including one or more digital storage devices; and
   a plurality of instructions stored in the memory and executable by the one or more processors to:
   receive a historical dataset relating to each system of a plurality of systems, the historical dataset including maintenance data and operational data,
   evaluate correlation between each of a plurality of operational data features and maintenance events of the maintenance data, using a supervised machine learning classification model,
   display a quantitative result of the evaluation for each operational data feature in a graphical user interface,
   receive a selection of one or more operational data features of the plurality of evaluated operational data features,
   generate a predictive maintenance model, using the selected one or more operational data features according to a machine learning method.

A1. The data processing system of A0, wherein the maintenance events include component replacements.

A2. The data processing system of A0 or A1, wherein the maintenance events include failure events.

A3. The data processing system of any of A0-A2, wherein the plurality of systems is a fleet of aircraft, and the maintenance events include one or more of (a) aircraft maintenance messages, (b) aircraft fault messages, (c) routine aircraft maintenance, (d) airline maintenance log entries, (e) crew incident write-ups.

A4. The data processing system of any of A0-A3, wherein the plurality of instructions are further executable by the one or more processors to receive a selection of the plurality of operational data features and the maintenance events, prior to evaluating correlation.

A5. The data processing system of A4, wherein the operational data are time-labeled, and the plurality of instructions are further executable by the one or more processors to:
   divide operational data associated with each of the selected plurality of operational data features into multiple time periods according to a selected time relationship to the maintenance events, and
   assign a qualitative label to each of the time periods.

A6. The data processing system of A5, wherein the operational data are divided into at least three time periods.

A7. The data processing system of A6, wherein the at least three time periods include a first period of time more than a first threshold time prior to a maintenance event, and a second period of time less than a second threshold time prior to a maintenance event.

A8. The data processing system of A7, wherein the first and second threshold times are selectable by a user.

A9. The data processing system of any of A5-A8, wherein the qualitative labels include 'healthy' and 'degraded'.

A10. The data processing system of any of A5-A9, wherein the supervised machine learning classification model is trained using the assigned qualitative labels.

A11. The data processing system of any of A0-A10, wherein the plurality of operational data features and the maintenance events are selectable by a user using a plurality of interactive elements of the graphical user interface.

A12. The data processing system of any of A0-A11, wherein the plurality of systems are a fleet of aircraft.

A13. The data processing system of any of A0-A12, wherein the quantitative result of the evaluation for each operational data feature is a relative ranking of correlation.

A14. The data processing system of A13, wherein evaluating correlation includes iteration of a supervised machine learning classification model.

A15. The data processing system of A14, wherein iteration of the supervised machine learning classification model includes recursive operational data feature elimination, the relative ranking of correlation corresponding to an order of elimination.

A16. The data processing system of any of A0-A15, wherein displaying the quantitative result of the evaluation for each operational data feature includes displaying a heat map of the quantitative result of the evaluation for each combination of operational data feature and maintenance event.

A17. The data processing system of any of A0-A16, wherein the plurality of instructions are further executable by the one or more processors to:
   for each operational data feature, select a subset of the maintenance events for which the quantitative result of the evaluation of the respective operational data feature is greater than a selected threshold value, for each operational data feature, calculate a score by averaging the quantitative results of the evaluations of the respective operational data feature for the maintenance events of the selected subset, and display a graph of a count of the maintenance events in the selected subset and the calculated score for each operational data feature.

A18. The data processing system of any of A0-A17, wherein the plurality of instructions are further executable by the one or more processors to:

cluster the operational data features of the plurality of operational data features into a plurality of clusters, according to the quantitative results of the evaluations of each operational data feature, using a machine learning method, and display the operational data features in the graphical user interface according to the plurality of clusters.

B0. A data processing system for assisted maintenance data analysis, comprising:

one or more processors;

a memory including one or more digital storage devices; and a plurality of instructions stored in the memory and executable by the one or more processors to:

receive a historical dataset relating to each system of a plurality of systems, the historical dataset including maintenance data and operational data, evaluate correlation between each of a plurality of operational data features and maintenance events of the maintenance data, using a supervised machine learning classification model, display a quantitative result of the evaluation for each operational data feature in a graphical user interface.

C0. A computer implemented method of generating a predictive maintenance model, comprising:

receiving a historical dataset relating to each system of a plurality of systems, the historical dataset including maintenance data and operational data, evaluating correlation between each of a plurality of operational data features and maintenance events of the maintenance data, using a supervised machine learning classification model, displaying a quantitative result of the evaluation for each operational data feature in a graphical user interface, receiving a selection of one or more operational data features of the plurality of operational data features, generating a predictive maintenance model, using the selected one or more operational data features according to a machine learning method.

D0. A computer program product for generating predictive maintenance models, the computer program product comprising:

a non-transitory computer-readable storage medium having computer-readable program code embodied therewith, the computer readable program code configured to cause a data processing system to generate a predictive maintenance model, the computer readable program code comprising:

at least one instruction to receive a historical dataset relating to each system of a plurality of systems, the historical dataset including maintenance data and operational data, at least one instruction to evaluate correlation between each of a plurality of operational data features and maintenance events of the maintenance data, using a supervised machine learning classification model, at least one instruction to display a quantitative result of the evaluation for each operational data feature in a graphical user interface, at least one instruction to receive a selection of one or more operational data features of the plurality of operational data features, and at least one instruction to generate a predictive maintenance model, using the selected one or more operational data features according to a machine learning method.

E0. A data processing system for analyzing data relating to aircraft operation and maintenance, comprising:

a processing system;

a memory including a digital storage device; and a plurality of instructions stored in the memory and executable by the processing system to:

receive a historical dataset relating to a plurality of aircraft, the historical dataset including maintenance data and operational data;

evaluate correlation between operational data features derived from the operational data, and maintenance events derived from the maintenance data using a supervised machine learning classification model, and display a quantitative result of the evaluation for one or more operational data features in a graphical user interface.

E1. The data processing system of E0, wherein the plurality of instructions are further executable by the processing system to:

receive a selection of one or more operational data features of the plurality of evaluated operational data features, and generate a predictive maintenance model, using the selected one or more operational data features according to a machine learning method.

F0. A data processing system for analyzing data relating to aircraft operation and maintenance, comprising:

a processing system;

a memory including a digital storage device; and a plurality of instructions stored in the memory and executable by the processing system to:

receive a historical dataset relating to a plurality of aircraft, the historical dataset including maintenance data and operational data, identify events of interest in the maintenance data, identify key words related to the events in the maintenance data using text analytics, cluster the events into categories based on the identified key words, and display a representation of the categories in a graphical user interface.

F1. The data processing system of F0, wherein the events include one or more of (a) component replacements, (b) maintenance messages, (c) fault messages, (d) routine aircraft maintenance, (e) maintenance log entries, (f) crew incident write-ups, (g) shop findings.

F2. The data processing system of F0 or F1, wherein the events are failure events and the categories are failure mode categories.

F3. The data processing system of any of F0-F2, wherein the plurality of instructions are further executable to:

receive a selection of one or more operational data features related to a first category of the categories, and generate a predictive maintenance model for the first category, using the selected operational data features according to a machine learning method.

G0. A data processing system for generating predictive maintenance models, comprising:
  one or more processors;
  a memory including one or more digital storage devices; and
  a plurality of instructions stored in the memory and executable by the one or more processors to:
  receive a historical dataset relating to each system of a plurality of systems, the historical dataset including maintenance data and operational data,
  identify events of interest in the maintenance data,
  identify key words related to the events in the maintenance data using text analytics,
  cluster the events into categories based on the identified key words,
  display a representation of the categories in a graphical user interface,
  receive a selection of one or more operational data features related to a category of the categories,
  generate a predictive maintenance model for the first category, using the selected operational data features according to a machine learning method.

G1. The data processing system of G0, wherein the text analytics include topic modeling.

G2. The data processing system of G1, wherein each event is assigned to a category according to a topic modelling score calculated based on the identified key words.

G3. The data processing system of any of G0-G2, wherein the text analytics are performed on at least one of (a) fault messages, (b) maintenance messages, (c) maintenance logs, and (d) shop tear-down reports.

G4. The data processing system of any of G0-G3, wherein the text analytics are performed on a plurality of subsets of the maintenance data, each subset corresponding to a selected period of time before one of the identified events.

G5. The data processing system of any of G0-G4 wherein the operational data includes time-labeled telemetry from each system of the plurality of systems.

G6. The data processing system of any of G0-G5, wherein the displayed representation of the categories includes the identified key words and a graphical comparison of the significance of the identified key words.

G7. The data processing system of G6, wherein the displayed representation of the categories further includes a graphical representation of the identified events and a probability score for the category assignment of each event.

G8. The data processing system of any of G0-G7 wherein the identified events are associated with a first sub-system of each system of the plurality of systems G9. The data processing system of any of G0-G8, wherein the plurality of systems are a fleet of aircraft.

H0. A data processing system for assisted maintenance data analysis, comprising:
  one or more processors;
  a memory including one or more digital storage devices; and
  a plurality of instructions stored in the memory and executable by the one or more processors to:
  receive a historical dataset relating to each system of a plurality of systems, the historical dataset including maintenance data and operational data,
  identify events of interest in the maintenance data,
  identify key words related to the events in the maintenance data using text analytics,
  cluster the events into categories based on the identified key words, display a representation of the categories in a graphical user interface.

H1. The data processing system of H0, further comprising receiving a target number of categories, wherein clustering the events includes clustering the events into the target number of categories.

H2. The data processing system of H0 or H1, further comprising receiving a target range of numbers of categories, and wherein for each number in the range of numbers, clustering the events includes clustering the events into the respective number of categories.

J0. A computer implemented method of generating a predictive maintenance model, comprising:
  receiving a historical dataset relating to each system of a plurality of systems, the historical dataset including maintenance data and operational data,
  identifying events of interest in the maintenance data,
  identifying key words related to the events in the maintenance data using text analytics,
  clustering the events into categories based on the identified key words,
  displaying a representation of the categories in a graphical user interface,
  receiving a selection of one or more operational data features related to a first category of the categories,
  generating a predictive maintenance model for the first category, using the selected operational data features according to a machine learning method.

J1. The computer implemented method of J0, wherein displaying a representation of the categories includes displaying relative priority of the categories.

J2. The computer implemented method of J1, further including receiving information regarding operational impact of one or more of the categories, and calculating relative priority of the categories based on the received information.

J3. The computer implemented method of J2, wherein the received information includes at least one of (a) a repair cost or (b) a flight delay.

J4. The computer implemented method of any of J1-J3, wherein displaying a representation of the categories further includes displaying a quantitative evaluation of an economic impact.

J5. The computer implemented method of any of J1-J4, wherein displaying a representation of the categories further includes displaying a quantitative evaluation of an operational impact.

K0. A computer program product for generating predictive maintenance models, the computer program product comprising:
  a non-transitory computer-readable storage medium having computer-readable program code embodied in the storage medium, the computer readable program code configured to cause a data processing system to generate a predictive maintenance model, the computer readable program code comprising:
  at least one instruction to receive a historical dataset relating to each system of a plurality of systems, the historical dataset including maintenance data and operational data,
  at least one instruction to identify events of interest in the maintenance data,
  at least one instruction to identify key words related to the events in the maintenance data using text analytics,
  at least one instruction to cluster the events into categories based on the identified key words,
  at least one instruction to display a representation of the categories in a graphical user interface, at least one instruction to receive a selection of one or more operational data features related to a first category of the categories, at least one instruction to generate a predictive maintenance model for the first category, using the selected operational data features according to a machine learning method.

Advantages, Features, and Benefits

The different examples of the predictive maintenance model design system described herein provide several advantages over known solutions for using machine learning models to forecast maintenance. For example, illustrative examples described herein allow creation of models for effective maintenance forecasting without programming or data science expertise.

Additionally, and among other benefits, illustrative examples described herein facilitate investigation of suspected data patterns and precursor signatures in a large and complex dataset.

Additionally, and among other benefits, illustrative examples described herein allow direct comparison of the predictive value of candidate data features.

Additionally, and among other benefits, illustrative examples described herein allow separation of maintenance events into multiple modes, to facilitate identification of distinct or separate precursor signatures.

Additionally, and among other benefits, illustrative examples described herein facilitate rapid quantitative evaluation of multiple data features.

No known system or device can perform these functions, particularly in a large dataset based on recorded telemetry and maintenance data from complex systems with many parts and sub-systems. Thus, the illustrative examples described herein are particularly useful for aircraft maintenance forecasting. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A data processing system for generating predictive maintenance models, comprising:
one or more processors;
a memory including one or more digital storage devices; and
a plurality of instructions stored in the memory and executable by the one or more processors to:
receive a historical dataset relating to each system of a plurality of systems, the historical dataset including maintenance data and operational data,
evaluate the importance of each of a plurality of operational data features in predicting each of a plurality of maintenance events of the maintenance data, using a supervised machine learning classification model,
display a quantitative result of the evaluation for each operational data feature in a graphical user interface,
receive a selection of one or more operational data features of the plurality of operational data features,
generate a predictive maintenance model, using the selected one or more operational data features according to a machine learning method.

2. The data processing system of claim 1, wherein the maintenance events include component replacements.

3. The data processing system of claim 1, wherein the maintenance events include failure events.

4. The data processing system of claim 1, wherein the plurality of systems is a fleet of aircraft, and the maintenance events include one or more of (a) aircraft maintenance messages, (b) aircraft fault messages, (c) routine aircraft maintenance, (d) airline maintenance log entries, (e) crew incident write-ups.

5. The data processing system of claim 1, wherein the plurality of instructions are further executable by the one or more processors to receive a selection of the plurality of operational data features and the maintenance events, prior to evaluating correlation.

6. The data processing system of claim 5, wherein the operational data are time-labeled, and the plurality of instructions are further executable by the one or more processors to:
divide operational data associated with each of the selected plurality of operational data features into multiple time periods according to a selected time relationship to the selected maintenance events, and
assign a qualitative label to each of the time periods.

7. The data processing system of claim 6, wherein the operational data are divided into at least three time periods.

8. The data processing system of claim 7, wherein the at least three time periods include a first period of time more than a first threshold time prior to a maintenance event, and a second period of time less than a second threshold time prior to a maintenance event.

9. The data processing system of claim 8, wherein the first and second threshold times are selectable by a user.

10. The data processing system of claim 6, wherein the qualitative labels include 'healthy' and 'degraded'.

11. The data processing system of claim 6, wherein the supervised machine learning classification model is trained using the assigned qualitative labels.

12. The data processing system of claim 1, wherein the plurality of operational data features and the plurality of maintenance events are selected by a user using a plurality of interactive elements of the graphical user interface.

13. The data processing system of claim 1, wherein the quantitative result of the evaluation for each operational data feature is a relative ranking.

14. The data processing system of claim 13, wherein the evaluation includes iteration of a supervised machine learning classification model.

15. The data processing system of claim 14, wherein iteration of the supervised machine learning classification model includes recursive feature elimination, the relative ranking corresponding to an order of elimination.

16. The data processing system of claim 1, wherein displaying the quantitative result of the evaluation for each operational data feature includes displaying a heat map of the quantitative result of the evaluation for each combination of operational data feature and maintenance event.

17. The data processing system of claim 1, wherein the plurality of instructions are further executable by the one or more processors to:
for each operational data feature, select a subset of the maintenance events for which the quantitative result of the evaluation of the respective operational data feature is greater than a selected threshold value,
for each operational data feature, calculate a score by averaging the quantitative results of the evaluations of the respective operational data feature for the maintenance events of the selected subset, and
display a graph of a count of the maintenance events in the selected subset and the calculated score for each operational data feature.

18. The data processing system of claim 1, wherein the plurality of instructions are further executable by the one or more processors to:
cluster the operational data features of the plurality of operational data features into a plurality of clusters, according to the quantitative results of the evaluations of each operational data feature, using a machine learning method, and
display the operational data features in the graphical user interface according to the plurality of clusters.

19. A computer implemented method of generating a predictive maintenance model, comprising:
receiving a historical dataset relating to each system of a plurality of systems, the historical dataset including maintenance data and operational data,
evaluating the importance of each of a plurality of operational data features in predicting each of a plurality of maintenance events of the maintenance data, using a supervised machine learning classification model,
displaying a quantitative result of the evaluation for each operational data feature in a graphical user interface,
receiving a selection of one or more operational data features of the plurality of operational data features,
generating a predictive maintenance model, using the selected one or more operational data features according to a machine learning method.

20. A data processing system for generating predictive maintenance models, comprising:
one or more processors;
a memory including one or more digital storage devices; and
a plurality of instructions stored in the memory and executable by the one or more processors to:
receive a historical dataset relating to each system of a plurality of systems, the historical dataset including maintenance data and operational data,
evaluate correlation between each of a plurality of operational data features and maintenance events of the maintenance data, using iteration of a supervised machine learning classification model with recursive feature elimination,
display a quantitative result of the evaluation for each operational data feature in a graphical user interface,
receive a selection of one or more operational data features of the plurality of operational data features, and
generate a predictive maintenance model, using the selected one or more operational data features according to a machine learning method.

* * * * *